US012520121B2

(12) United States Patent
Jung et al.

(10) Patent No.: US 12,520,121 B2
(45) Date of Patent: Jan. 6, 2026

(54) METHOD AND APPARATUS IN WHICH UE SUPPORTING MULTIPLE USIMS TRANSMITS UE ASSISTANCE INFORMATION IN WIRELESS COMMUNICATION SYSTEM

(71) Applicant: Samsung Electronics Co., Ltd., Suwon-si (KR)

(72) Inventors: Sangyeob Jung, Suwon-si (KR); Anil Agiwal, Suwon-si (KR); Seungri Jin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 481 days.

(21) Appl. No.: 18/084,038

(22) Filed: Dec. 19, 2022

(65) Prior Publication Data

US 2023/0209331 A1  Jun. 29, 2023

(30) Foreign Application Priority Data

Dec. 23, 2021 (KR) .................. 10-2021-0185981
Feb. 11, 2022 (KR) .................. 10-2022-0017990

(51) Int. Cl.
*H04W 8/18* (2009.01)
*H04W 36/08* (2009.01)
*H04W 76/20* (2018.01)

(52) U.S. Cl.
CPC ........... *H04W 8/183* (2013.01); *H04W 36/08* (2013.01); *H04W 76/20* (2018.02)

(58) Field of Classification Search
CPC ..... H04W 8/183; H04W 36/08; H04W 36/14; H04W 36/249; H04W 76/20; H04W 76/27
See application file for complete search history.

(56) References Cited

U.S. PATENT DOCUMENTS

2016/0242079 A1 *  8/2016  Islam .............. H04W 36/00224
2021/0136658 A1 *  5/2021  Rönneke ............... H04W 48/06
(Continued)

FOREIGN PATENT DOCUMENTS

CA      3232057 A1 *  6/2023  ........ H04W 36/1443
CN   116017331 A  *  4/2023  ............ H04W 28/02
(Continued)

OTHER PUBLICATIONS

VIVO; Running NR RRC CR for MUSIM; 3GPP TSG-RAN WG2 Meeting #116-e; R2-2111602; Electronic Meeting; Nov. 1-12, 2021.
(Continued)

*Primary Examiner* — Sujoy K Kundu
*Assistant Examiner* — Vladislav Y Agureyev
(74) *Attorney, Agent, or Firm* — Jefferson IP Law, LLP

(57) ABSTRACT

The disclosure relates to a $5^{th}$ generation (5G) or $6^{th}$ generation (6G) communication system for supporting a higher data transmission rate. A method performed by a user equipment (UE) supporting multi-universal subscriber identity module (MUSIM), in a wireless communication system is provided. The method includes receiving, from a base station, configuration information on a MUSIM operation, transmitting, to the base station, an UE assistance information message, in case that the UE need to leave from a radio resource control (RRC) connected state connected using a first universal subscriber identity module (USIM) and a timer for transitioning state is not running, and starting the timer for transitioning state based on the configuration information on the MUSIM operation.

16 Claims, 13 Drawing Sheets

(56) References Cited

U.S. PATENT DOCUMENTS

| | | | |
|---|---|---|---|
| 2021/0227616 A1 | 7/2021 | Lee et al. | |
| 2022/0104163 A1* | 3/2022 | Kim | H04W 76/20 |
| 2022/0174599 A1* | 6/2022 | Kuang | H04W 24/10 |
| 2022/0279469 A1* | 9/2022 | Ingale | H04W 76/30 |
| 2022/0338074 A1* | 10/2022 | Hu | H04W 36/0058 |
| 2022/0369172 A1 | 11/2022 | Hwang et al. | |
| 2023/0047213 A1* | 2/2023 | Chen | H04W 74/002 |
| 2023/0080113 A1 | 3/2023 | Hong | |
| 2023/0127705 A1* | 4/2023 | Ozturk | H04W 76/15 370/329 |
| 2023/0180148 A1* | 6/2023 | Kung | H04W 52/365 370/318 |
| 2023/0254918 A1* | 8/2023 | Gurumoorthy | H04W 8/24 455/435.1 |
| 2023/0262706 A1* | 8/2023 | Li | H04W 72/51 370/329 |
| 2023/0389119 A1* | 11/2023 | Araujo | H04W 76/15 |
| 2024/0032131 A1* | 1/2024 | Niu | H04W 24/02 |
| 2024/0107409 A1* | 3/2024 | Da Silva | H04W 36/0033 |
| 2024/0260133 A1* | 8/2024 | Kim | H04W 88/06 |
| 2024/0267814 A1* | 8/2024 | Kim | H04W 76/15 |
| 2024/0267837 A1* | 8/2024 | Liu | H04W 28/02 |
| 2024/0422640 A1* | 12/2024 | Wu | H04W 36/249 |
| 2025/0031120 A1* | 1/2025 | Xiao | H04W 24/02 |

FOREIGN PATENT DOCUMENTS

| | | | | |
|---|---|---|---|---|
| CN | 116261157 A * | 6/2023 | | H04W 24/02 |
| CN | 117880919 A * | 4/2024 | | H04L 5/0053 |
| KR | 10-2022-0134365 A | 10/2022 | | |
| WO | 2021/066567 A1 | 4/2021 | | |
| WO | WO-2021113581 A1 * | 6/2021 | | H04W 68/00 |
| WO | 2021/153927 A1 | 8/2021 | | |
| WO | WO-2021236917 A2 * | 11/2021 | | H04W 36/00226 |
| WO | WO-2022084949 A1 * | 4/2022 | | H04W 76/15 |
| WO | WO-2022130273 A1 * | 6/2022 | | H04W 36/0033 |

OTHER PUBLICATIONS

QUALCOMM Incorporated; Correction to re-sending UEAssistanceInformation upon reconfiguration w/ sync; 3GPP TSG-RAN WG2 Meeting #110-e; R2-2006374; Jun. 1-12, 2020.

Ericcson; Discussion on switchover procedure without leaving RRC_CONNECTED state; 3GPP TSG-RAN WG2 #116-e; Tdoc TR2-2110775; Revision of R2-2107973; Electronic Meeting; Nov. 1-12, 2021.

Ericcson; Discussion on switchover procedure without leaving RRC_CONNECTED state; 3GPP TSG-RAN WG2 #116e-bis; Tdoc R2-2201482; Revision of R2-2110775; Electronic Meeting; Jan. 17-25, 2022.

Extended European Search Report dated Nov. 6, 2024; European Appln. No. 22911828.6-1215 / 4285688 PCT/KR2022020760.

Samsung, "Open issues on network switching for Multi-USIM devices," 3GPP TSG-RAN WG2 Meeting #114-e R2-2105437, Online, May 17-May 29, 2021.

ZTE Corporation, Sanechips, "Consideration on the Switching Notification Procedure," 3GPP TSG-RAN WG2 Meeting #114-e R2-2105165 Online, May 19-May 27, 2021.

International Search Report and written opinion dated Mar. 22, 2023, issued in International Application No. PCT/KR2022/020760.

Nokia et al.; Further analysis on the signalling message contents for switching notification; 3GPP TSG-RAN WG2 Meeting #116 Electronic; R2-2110144; Online; Nov. 1-12, 2021.

Samsung; Finalizing NW switching with leaving from RRC_CONNECTED; 3GPP TSG-RAN WG2 Meeting #117-e; R2-2202240; Online; Feb. 21-Mar. 3, 2022.

Partial Supplementary European Search Report dated Jul. 17, 2024; European Appln. No. 22911828.6-1215 / 4285688 PCT/KR2022020760.

* cited by examiner

METHOD AND APPARATUS IN WHICH UE SUPPORTING MULTIPLE USIMS TRANSMITS UE ASSISTANCE INFORMATION IN WIRELESS COMMUNICATION SYSTEM

CROSS-REFERENCE TO RELATED APPLICATION(S)

This application is based on and claims priority under 35 U.S.C. § 119(a) of a Korean patent application number 10-2021-0185981, filed on Dec. 23, 2021, in the Korean Intellectual Property Office, and of a Korean patent application number 10-2022-0017990, filed on Feb. 11, 2022, in the Korean Intellectual Property Office, the disclosure of each of which is incorporated by reference herein in its entirety.

BACKGROUND

1. Field

The disclosure relates to a method and apparatus for transmitting User Equipment (UE) assistance information in a wireless communication system.

2. Description of Related Art $5^{th}$ generation (5G) mobile communication technologies define broad frequency bands such that high transmission rates and new services are possible, and can be implemented not only in "Sub 6 gigahertz (GHz)" bands such as 3.5 GHz, but also in "Above 6 GHz" bands referred to as mmWave including 28 GHz and 39 GHz. In addition, it has been considered to implement $6^{th}$ generation (6G) mobile communication technologies (referred to as Beyond 5G systems) in terahertz bands (for example, 95 GHz to 3 terahertz (THz) bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BandWidth Part (BWP), new channel coding methods such as a Low Density Parity Check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as Vehicle-to-everything (V2X) for aiding driving determination by autonomous vehicles based on information regarding positions and states of vehicles transmitted by the vehicles and for enhancing user convenience, New Radio Unlicensed (NR-U) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, Integrated Access and Backhaul (IAB) for providing a node for network service area expansion by supporting a wireless backhaul link and an access link in an integrated manner, mobility enhancement including conditional handover and Dual Active Protocol Stack (DAPS) handover, and two-step random access for simplifying random access procedures (2-step random access channel (RACH) for new radio (NR)). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting Augmented Reality (AR), Virtual Reality (VR), Mixed Reality (MR) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using Orbital Angular Momentum (OAM), and Reconfigurable Intelligent Surface (RIS), but also full-duplex technology for increasing frequency efficiency of 6G mobile communication technologies and improving system networks, AI-based communication technology for implementing system optimization by utilizing satellites and AI from the design stage and internalizing end-to-end AI support functions, and next-generation distributed computing technology for implementing services at levels of complexity exceeding the limit of UE operation capability by utilizing ultra-high-performance communication and computing resources.

Since the development of the wireless communication system makes it possible to provide various services as described above, there is a need for a method for providing the services smoothly. In particular, a method in which a User Equipment (UE) efficiently transmits UE assistance information is required.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and method capable of efficiently providing a service in a mobile communication system.

Additional aspects will be set forth in part in the description which follows and, in part, will be apparent from the description, or may be learned by practice of the presented embodiments.

In accordance with an aspect of the disclosure, a method performed by a user equipment (UE) supporting multi-universal subscriber identity module (MUSIM), in a wireless communication system is provided. The method includes receiving, from a base station, configuration information on a MUSIM operation, transmitting, to the base station, a UE assistance information message, based on the UE needing to leave from a radio resource control (RRC) connected state connected using a first universal subscriber identity module (USIM) and a timer for transitioning state not running, and starting the timer for transitioning state based on the configuration information on the MUSIM operation.

The method further includes leaving from the RRC connection state connected using the first USIM based on a response not being received from the base station until the timer for transitioning state expires, after the UE assistance information message is transmitted.

The UE assistance information message may include information on a preference RRC state of the UE.

The method further includes performing a handover process, transmitting, to a target base station of the handover process, the UE assistance information message based on a reconfigurationWithSync parameter being included in the configuration information for the handover process, the UE assistance information message being transmitted to a base station over a source base station of the handover process within a predetermined time, and the UE assistance information message being configured to be transmitted to the target base station of the handover process, and starting or restarting the timer for transitioning state.

The method further includes performing a handover process, transmitting, to a target base station of the handover process, the UE assistance information message based on a reconfigurationWithSync parameter being included in the configuration information for the handover process, a RRCReconfiguration message being applied due to a conditional reconfiguration execution, the UE assistance information message being configured to be transmitted to the target base station of the handover process, and the UE having initiated a transmission of the UE assistance information message to the target base station, and starting or restarting the timer for transitioning state.

The transmitted UE assistance information message may include first preference MUSIM gap information of the UE, and The method may further include transmitting a UE assistance information message including a second preferred MUSIM gap information currently preferred by the UE, based on the first preferred MUSIM gap information and the second preferred MUSIM gap information being different and a timer for prohibiting a MUSIM gap change not running, and starting or restarting the timer for prohibiting the MUSIM gap change.

The transmission of the UE assistance information message including the second preferred MUSIM gap information may not be performed, based on the second preferred MUSIM gap information being information excluding only aperiodic MUSIM gap information among the first preferred MUSIM gap information.

The configuration information on the MUSIM operation may include a parameter regarding the timer for transitioning state and a parameter regarding a timer for prohibiting a MUSIM gap change.

The configuration information on the MUSIM operation may include information on a MUSIM gap and information on a MUSIM state switching.

The method further includes receiving, from the base station, an RRC Reestablishment message, and releasing the MUSIM gap information configured based on the configuration information.

In accordance with another aspect of the disclosure, a user equipment (UE) supporting multi-USIM (MUSIM) is provided. The UE includes transceiver, and at least one processor coupled with the transceiver and configured to receive, from a base station, configuration information on a MUSIM operation, transmit, to the base station, a UE assistance information message, based on the UE needing to leave from a RRC connected state connected using a first universal subscriber identity module (USIM) and a timer for transitioning state not running, and start the timer for transitioning state based on the configuration information on the MUSIM operation.

The at least one processor may be further configured to leave from the RRC connection state connected using the first USIM based on a response not being received from the base station until the timer for transitioning state expires, after the UE assistance information message is transmitted.

The UE assistance information message may include information on a preference RRC state of the UE.

The at least one processor may be further configured to perform a handover process, transmit, to a target base station of the handover process, the UE assistance information message based on a reconfigurationWithSync parameter being included in the configuration information for the handover process, the UE assistance information message being transmitted to a base station over a source base station of the handover process within a predetermined time, and the UE assistance information message being configured to be transmitted to the target base station of the handover process, and start or restart the timer for transitioning state.

The at least one processor may be further configured to perform a handover process, transmit, to a target base station of the handover process, the UE assistance information message based on a reconfigurationWithSync parameter being included in the configuration information for the handover process, a RRCReconfiguration message being applied due to a conditional reconfiguration execution, the UE assistance information message being configured to be transmitted to the target base station of the handover process, and the UE having initiated a transmission of the UE assistance information message to the target base station, and start or restart the timer for transitioning state.

The transmitted UE assistance information message may include first preference MUSIM gap information of the UE, and The at least one processor may be further configured to transmit a UE assistance information message including a second preferred MUSIM gap information currently preferred by the UE, based on the first preferred MUSIM gap information and the second preferred MUSIM gap information being different and a timer for prohibiting a MUSIM gap change not running, and start or restart the timer for prohibiting the MUSIM gap change.

The transmission of the UE assistance information message including the second preferred MUSIM gap information may not be performed, based on the second preferred MUSIM gap information being information excluding only aperiodic MUSIM gap information among the first preferred MUSIM gap information.

The configuration information on the MUSIM operation may include a parameter regarding the timer for transitioning state and a parameter regarding a timer for prohibiting a MUSIM gap change.

The configuration information on the MUSIM operation may include information on a MUSIM gap and information on a MUSIM state switching.

The at least one processor may be further configured to receive, from the base station, an RRC Reestablishment message, and release the MUSIM gap information configured based on the configuration information.

The disclosure provides an apparatus and method capable of efficiently providing a service in a mobile communication system.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

Figure 1A:
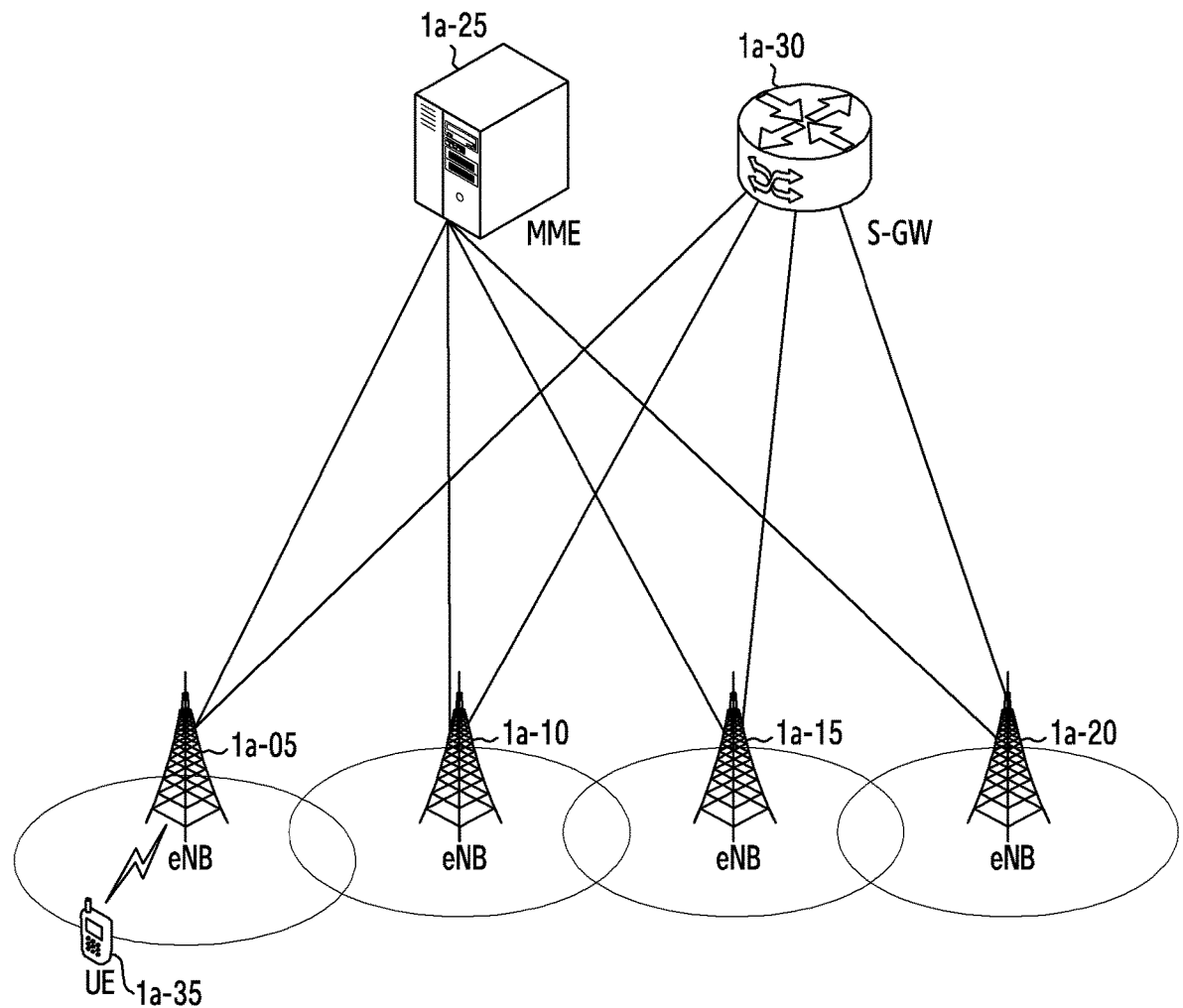
FIG. 1A illustrates a structure of a Long Term Evolution (LTE) system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions or constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the same reason, some components may be exaggerated, omitted, or schematically illustrated in the accompanying drawings. Also, a size of each component does not completely reflect an actual size. In the drawings, like reference numerals denote like or corresponding components.

Advantages and features of the disclosure and methods of accomplishing the same may be understood more clearly by reference to the following detailed description of the embodiments and the accompanying drawings. However, the disclosure is not limited to embodiments disclosed below, and may be implemented in various forms. Rather, the embodiments are provided to complete the disclosure and to fully convey the concept of the disclosure to one of those ordinarily skilled in the art, and the disclosure will only be defined by the scope of claims. Throughout the specification, like reference numerals denote like components.

In this case, it will be understood that blocks of processing flow diagrams and combinations of the flow diagrams may be performed by computer program instructions. Since these computer program instructions may be loaded into a processor of a general purpose computer, a special purpose computer, or another programmable data processing apparatus, the instructions, which are performed by a processor of a computer or another programmable data processing apparatus, create a means for performing functions described in the block(s) of the flow diagram. The computer program instructions may be stored in a computer-usable or computer-readable memory capable of directing a computer or another programmable data processing apparatus to implement a function in a particular manner, and thus the instructions stored in the computer-usable or computer-readable memory may also be capable of producing manufacturing items containing an instruction means for performing the functions described in the block(s) of the flow diagram. The computer program instructions may also be loaded into a computer or another programmable data processing apparatus, and thus, instructions for operating the computer or another programmable data processing apparatus by generating a computer-executed process when a series of operations are performed in the computer or another programmable data processing apparatus may provide operations for performing the functions described in the block(s) of the flow diagram.

In addition, each block may represent part of a module, segment, or code which includes one or more executable instructions for executing specified logical function(s). It should also be noted that in some alternative implementations, functions mentioned in blocks may occur not in an orderly manner. For example, two blocks illustrated successively may actually be executed substantially concurrently, or the blocks may sometimes be performed in a reverse order according to corresponding functions.

The term '~unit' used herein means a software or hardware component, such as a Field Programmable Gate Array (FPGA) or Application Specific Integrated Circuit (ASIC), which performs certain tasks. However, the '~unit' is not limited to the software or hardware component. The '~unit' may be configured to reside on an addressable storage medium and configured to execute on one or more processors. Thus, for example, the '~unit' may include components, such as software components, object-oriented software components, class components, and task components, processes, functions, attributes, procedures, subroutines, segments of program code, drivers, firmware, microcode, circuitry, data, databases, data structures, tables, arrays, and variables. The functionality provided in the components and '~units' may be combined into fewer components or '~units' further separated into additional components and '~units. In addition thereto, the components and '~units' may be implemented to reproduce one or more Central Processing Units (CPUs) included in a device or a security multimedia card. In addition, the '~unit' may include at least one processor. In the following description, well-known functions or constructions are not described in detail when they would obscure the disclosure in unnecessary detail. Embodiment of the disclosure will be described hereinafter with reference to the accompanying drawings.

In the following description, a term for identifying an access node, terms referring to network entities, terms referring to messages, a term referring to an interface between network entities, terms referring to various pieces of identification information, or the like are exemplified for convenience of explanation. Therefore, the disclosure is not limited to the terms described below, and other terms having equivalent technical meanings may also be used.

Hereinafter, for convenience of explanation, terms and names defined in the $3^{rd}$ Generation Partnership Project (3GPP) Long Term Evolution (LTE) standard are used in the disclosure. However, the disclosure is not limited to the terms and names, and is also equally applied to a system conforming to other standards. In the disclosure, an eNB and a gNB may be interchangeably used for convenience of explanation. That is, a base station described as the eNB may represent the gNB.

Hereinafter, a base station is an entity which performs resource allocation of a terminal, and may be at least one of a gNode B, an eNode B, a Node B, a Base Station (BS), a radio access unit, a base station controller, and a node on a network. The terminal may include a User Equipment (UE), a Mobile Station (MS), a cellular phone, a smart phone, a computer, or a multimedia system capable of performing a communication function. Of course, the disclosure is not limited to the above example.

In particular, the disclosure is applicable to third generation partnership project (3GPP) NR (a $5^{th}$ generation mobile communication standard). In addition, the disclosure is applicable to an intelligent service (e.g., a smart home, a smart building, a smart city, a smart car, a connected car, healthcare, digital education, retail business, a security and safety-related service, etc.) based on a 5G communication technology and an IoT-related technology. In the disclosure, an eNB and a gNB may be interchangeably used for convenience of explanation. That is, a base station described as the eNB may represent the gNB. In addition, the term 'terminal' may represent not only handphones, NB-IoT devices, and sensors but also other wireless communication devices.

A wireless communication system is developed to a broadband wireless communication system which provides a high-speed and high-quality packet data service beyond the early voice-oriented services as in a communication standard, for example, High Speed Packet Access (HSPA), Long Term Evolution (LTE), Evolved Universal Terrestrial Radio Access (E-UTRA), or LTE-advanced (LTE-A) of 3GPP, High Rate Packet Data (HRPD) or Ultra Mobile Broadband (UMB) of 3GPP2, and 802.16e or the like of Institute of Electrical and Electronics Engineers (IEEE).

As a representative example of the broadband wireless communication system, the LTE system has adopted an Orthogonal Frequency Division Multiplexing (OFDM) scheme in a DownLink (DL) and has adopted a Single Carrier Frequency Division Multiple Access (SC-FDMA) scheme in an UpLink (UL). The UL refers to a radio link through which a terminal (e.g., a User Equipment (UE) or a Mobile Station (MS)) transmits data or a control signal to a Base Station (BS) (e.g., eNodeB), and the DL refers to a radio link through which the BS transmits data or a control signal to the terminal. In such a multiple access scheme, data or control information of each user is classified by generally assigning and operating the data or control information such that time-frequency resources for transmitting data or control information for each user do not overlap each other, that is, such that orthogonality is established.

As a future communication system after LTE system, a 5G (or NR) communication system has to be able to freely reflect various requirements of a user and a service provider, and thus, services satisfying various requirements at the same time need to be supported. The services considered for the 5G communication system include enhanced Mobile BroadBand (eMBB), massive Machine Type Communication (mMTC), Ultra Reliability Low Latency Communication (URLLC), etc.

According to an embodiment, the eMBB may aim to provide a data rate more improved than a data rate supported by the existing LTE, LTE-A, or LTE-Pro. For example, in the 5G communication system, the eMBB shall be able to provide a peak data rate of 20 Gbps in the DL and a peak data rate of 10 Gbps in the UL from the viewpoint of one BS. In addition, the 5G communication system may have to provide an increased user-perceived data rate simultaneously with providing the peak data rate. In order to satisfy such requirements, improvement of various transmitting/receiving techniques including a further improved Multiple-Input and Multiple-Output (MIMO) transmission technique may be required. In addition, signals are transmitted using a transmission bandwidth of up to 20 megahertz (MHz) in a 2 GHz band used in the current LTE, whereas the 5G communication system uses a bandwidth wider than 20 MHz in a frequency band of 3 to 6 GHz or more than 6 GHz, thereby satisfying a data rate required in the 5G communication system.

At the same time, mMTC is being considered to support application services such as Internet of Things (IoT) in the 5G communication system. The mMTC may require an access support of a terminal in a large scale in a cell, coverage enhancement of the terminal, improved battery time, and cost reduction of the terminal in order to efficiently provide the IoT. The IoT needs to be able to support a large number of terminals (e.g., 1,000,000 terminals/km2) in a cell because it is attached to various sensors and various devices to provide communication functions. In addition, since the terminal supporting the mMTC is more likely to be positioned in shaded areas not covered by a cell, such as an underground of a building due to a feature of the service, the terminal may require a wider coverage than other services provided by the 5G communication system. The terminal which supports the mMTC shall be configured as an inexpensive terminal and may require very long battery lifetime, such as 10 to 15 years, because it is difficult to frequently replace a battery of the terminal.

Lastly, as a cellular-based wireless communication system used mission critically, the URLLC may be used in a service used in, for example, remote control for a robot or machinery, industrial automation, unmanned aerial vehicle, remote health care, emergency alert, or the like. Accordingly, communication provided by the URLLC may have to provide very low latency (ultra-low latency) and very high reliability (ultra-high reliability). For example, a service supporting the URLLC shall satisfy air interface latency smaller than 0.5 milliseconds, and at the same time, may have a requirement of a packet error rate equal to less than 10-5. Accordingly, for the service supporting the URLLC, the 5G system may be required to provide a Transmit Time Interval (TTI) shorter than those for other services while securing reliable communication links by allocating more resources (wide resource) in a frequency band The three services, that is, eMBB, URLLC, and mMTC, considered in the aforementioned 5G communication system may be transmitted by being multiplexed in one system. In this case, the services may use different transmission/reception methods and transmission/reception parameters in order to satisfy different requirements of the respective services. However, the aforementioned mMTC, URLLC, and eMBB are only an example of different service types, and the service types to which the disclosure is applied are not limited to the above example.

In addition, although an embodiment of the disclosure is described hereinafter by taking an LTE, LTE-A, LTE Pro or 5G (or NR, next-generation mobile communication) system for example, the embodiment of the disclosure is also applicable to other types of communication systems having a similar technical background and channel format. In addition, the embodiment of the disclosure is also applicable to other communication systems through some modifications within a range not significantly departing from the scope of the disclosure under the decision of those skilled in the art.

FIG. 1A illustrates a structure of an LTE system according to an embodiment of the disclosure.

Referring to FIG. 1A, as illustrated, a radio access network of an LTE system includes next-generation base stations (e.g., evolved Node Bs (eNBs), Node Bs, or BSs) 1a-05, 1a-10, 1a-15, and 1a-20 and a Mobility Management Entity (MME) 1a-25, and a Serving-GateWay (S-GW) 1a-30. A user terminal (e.g., a User Equipment (UE) or a terminal) 1a-35 has access to an external network via the eNBs 1a-05 to 1a-20 and the S-GW 1a-30.

In FIG. 1A, the eNBs 1a-05 to 1a-20 correspond to the existing node B of a Universal Mobile Telecommunication System (UMTS) system. The eNB is coupled to the UE 1a-35 through a radio channel and performs a more complex role than the existing node B. In an LTE system, since every user traffic including a real-time service such as Voice over IP (VoIP) through an Internet protocol is served through a shared channel, a device for performing scheduling by collecting state information of UEs, such as a buffer state, an available transmission power state, a channel state, or the like may be required, and the eNBs 1a-05 to 1a-20 are responsible for this. In general, one eNB may control a plurality of cells. For example, in order to implement a transmission rate of 100 Mbps, the LTE system may use an Orthogonal Frequency Division Multiplexing (OFDM) as a radio access technology in a bandwidth of 20 MHz. In addition, of course, the disclosure is not limited to the above example. In addition, the eNBs 1a-05 to 1a-20 may apply Adaptive Modulation & Coding (AMC) which determines a modulation scheme and a channel coding rate according to a channel state of a UE. The S-GW 1a-30 is a device for providing a data bearer, and may create or remove the data bearer under the control of the MME 1a-25. The MME is a device which is in charge of various control functions as well as a mobility management function for the UE, and is coupled to a plurality of base stations.

Figure 1B:
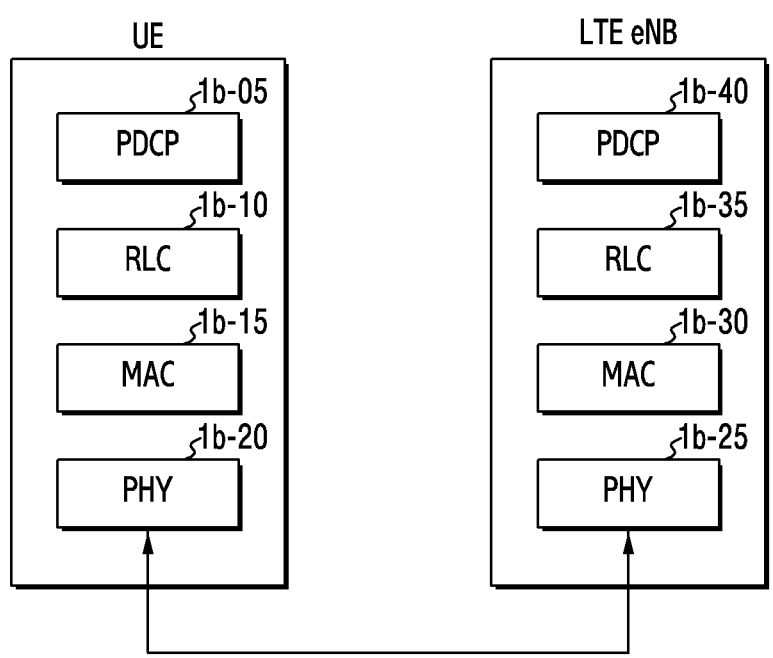
FIG. 1B illustrates a radio protocol structure in an LTE system according to an embodiment of the disclosure.

FIG. 1B illustrates a radio protocol structure in an LTE system according to an embodiment of the disclosure.

Referring to FIG. 1B, in a radio protocol of the LTE system, a UE and an eNB may respectively include Packet Data Convergence Protocols (PDCPs) 1b-05 and 1b-40, Radio Link Controls (RLCs) 1b-10 and 1b-35, and Medium Access Controls (MACs) 1b-15 and 1b-30. The PDCPs 1b-05 and 1b-40 may be in charge of an IP header compression/restoration operation or the like. A main function of the PDCP is summarized as follows. Of course, the disclosure is not limited to the following example.

Header compression and decompression function (Header compression and decompression: Robust Header Compression (ROHC) only)
  User data transfer function (Transfer of user data)

In-sequence delivery function (In-sequence delivery of upper layer PDUs at PDCP re-establishment procedure for RLC AM)

Re-ordering function (For split bearers in DC (only support for RLC AM): PDCP Packet Data Unit (PDU) routing for transmission and PDCP PDU reordering for reception)

Duplication detection function (Duplicate detection of lower layer service data units (SDUs) at PDCP re-establishment procedure for RLC AM)

Retransmission function (Retransmission of PDCP SDUs at handover and, for split bearers in DC, of PDCP PDUs at PDCP data-recovery procedure, for RLC AM)

Ciphering and deciphering function (Ciphering and deciphering)

Timer-based SDU discarding function (Timer-based SDU discard in uplink)

The RLCs 1b-10 and 1b-35 may perform an automatic repeat request (ARQ) operation or the like by reconfiguring a PDCP Packet Data Unit (PDU) with a proper size. A main function of the RLC is summarized as follows. Of course, the disclosure is not limited to the following example.

Data transfer function (Transfer of upper layer PDUs)

ARQ function (Error Correction through ARQ (only for Acknowledge Mode (AM) data transfer))

Concatenation, segmentation, and reassembly function (Concatenation, segmentation and reassembly of RLC SDUs (only for Unacknowledged Mode (UM) and AM data transfer))

Re-segmentation function (Re-segmentation of RLC data PDUs (only for AM data transfer))

Reordering function (Reordering of RLC data PDUs (only for UM and AM data transfer)

Duplication detection function (Duplicate detection (only for UM and AM data transfer))

Error detection function (Protocol error detection (only for AM data transfer))

RLC SDU discarding function (RLC SDU discard (only for UM and AM data transfer))

RLC re-establishment function (RLC re-establishment)

The MACs 1b-15 and 1b-30 are coupled to several RLC layer devices configured in one UE, and may perform an operation of multiplexing RLC PDUs to a MAC PDU and demultiplexing the RLC PDUs from the MAC PDU. A main function of the RLC is summarized as follows. Of course, the disclosure is not limited to the following example.

Mapping function (Mapping between logical channels and transport channels)

Multiplexing and demultiplexing function (Multiplexing/demultiplexing of MAC SDUs belonging to one or different logical channels into/from transport blocks (TB) delivered to/from the physical layer on transport channels)

Scheduling information reporting function (Scheduling information reporting)

HARQ function (Error correction through HARQ)

Priority handling function between logical channels (Priority handling between logical channels of one UE)

Priority handling function between UEs (Priority handling between UEs by means of dynamic scheduling)

MBMS service identification function (MBMS service identification)

Transport format selection function (Transport format selection)

Padding function (Padding)

The physical layers 1b-20 and 1b-25 perform an operation in which channel coding and modulation are performed on a higher layer data and thus an OFDM symbol is created and transmitted through a radio channel or in which demodulation and channel coding are performed on the OFDM symbol received through the radio channel and then are transferred to a higher layer. Of course, the disclosure is not limited to the above example.

Figure 1C:
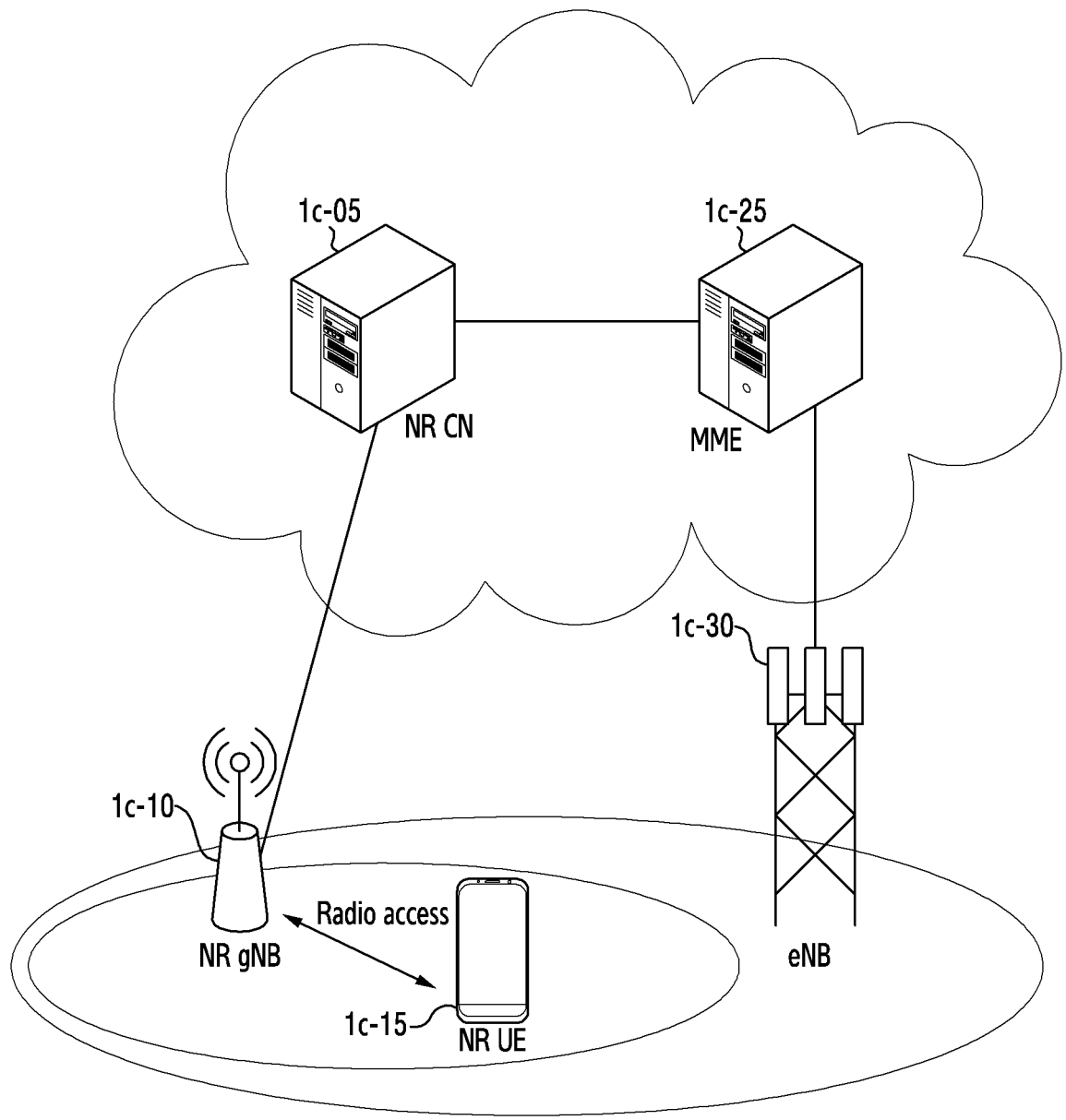
FIG. 1C illustrates a structure of a next-generation mobile communication system according to an embodiment of the disclosure.

FIG. 1C illustrates a structure of a next-generation mobile communication system according to an embodiment of the disclosure.

Referring to FIG. 1C, as illustrated, a radio access network of a wireless communication system (hereinafter, a next-generation mobile communication system, NR or 5G) may include a New Radio (NR) node B (hereinafter, an NR gNB or an NR eNB) 1c-10 and an NR Core Network (CN) 1c-05. A user terminal (hereinafter, a New Radio User Equipment (NR UE) or a terminal) 1c-15 may have access to an external network via the NR gNB 1c-10 and the NR CN 1c-05.

In FIG. 1C, the NR gNB 1c-10 may correspond to an evolved Node B (eNB) of the existing LTE system. The NR gNB may be coupled to the NR UE 1c-15 through a radio channel and may provide a more excellent service than the existing node B. In the next-generation mobile communication system, since every user traffic is served through a shared channel, a device for performing scheduling by collecting state information of UEs, such as a buffer state, an available transmission power state, a channel state, or the like may be required, and the NR gNB 1c-10 may be responsible for this. In general, one NR gNB may control a plurality of cells.

According to an embodiment of the disclosure, the next-generation mobile communication system may have at least the existing maximum bandwidth to implement ultra-high speed data transmission compared to the current LTE, and may additionally use a beamforming technology by using Orthogonal Frequency Division Multiplexing (OFDM) as a radio access technology. In addition, according to an embodiment of the disclosure, the NR gNB 1c-10 may apply an Adaptive Modulation & Coding (AMC) scheme which determines a modulation scheme and a channel coding rate in accordance with a channel state of a UE. The NR CN 1c-05 may perform a function such as mobility support, bearer setup, quality of service (QoS) setup, or the like. The NR CN 1c-05 is a device which is in charge of various control functions in addition to a mobility management function for the UE, and may be coupled to a plurality of base stations. In addition, the next-generation mobile communication system may also interwork with the existing LTE system, and the NR CN may be coupled to the MME 1c-25 via a network interface. The MME may be coupled to the eNB 1c-30 which is the existing base station.

Figure 1D:
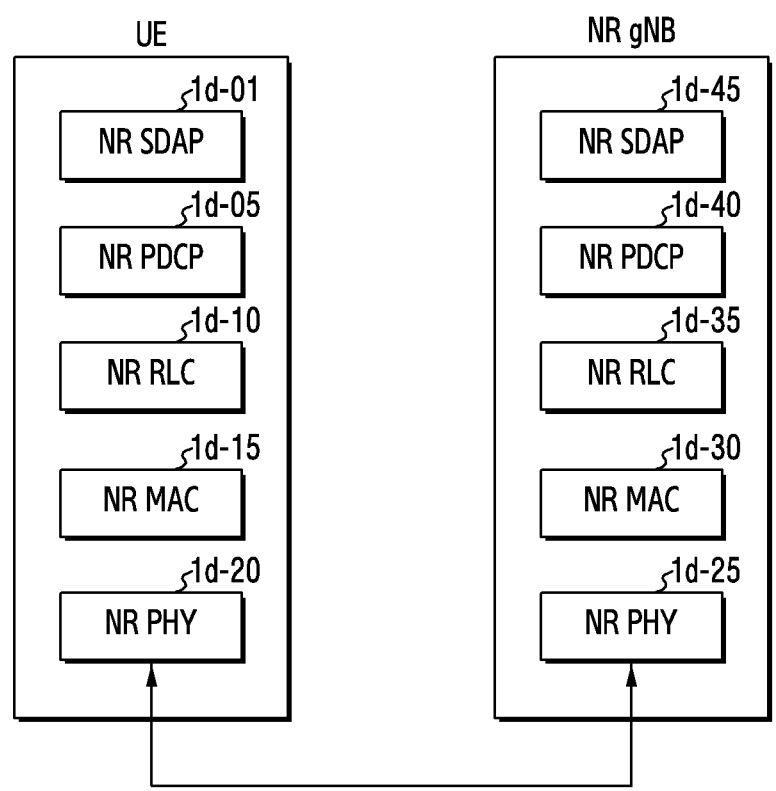
FIG. 1D illustrates a radio protocol structure of a next-generation mobile communication system according to an embodiment of the disclosure.

FIG. 1D illustrates a radio protocol structure of a next-generation mobile communication system according to an embodiment of the disclosure.

Referring to FIG. 1D, in a radio protocol of the next-generation mobile communication system, a UE and an NR gNB may respectively include NR Service Data Adaptive Protocols (SDAPs) 1d-01 and 1d-45, NR Packet Data Convergence Protocols (PDCP) 1d-05 and 1d-40, NR Radio Link Controls (RLCs) 1d-10 and 1d-35, and NR Medium Access Controls (MACs) 1d-15 and 1d-30.

According to an embodiment of the disclosure, a main function of the NR SDAPs 1d-01 and 1d-45 may include some of the following functions. Of course, the disclosure is not limited to the following example.

User data transfer function (transfer of user plane data)
    QoS flow and data bearer mapping function for uplink and downlink (mapping between a QoS flow and a DRB for both DL and UL)
    QoS flow ID marking function for uplink and downlink (marking QoS flow ID in both DL and UL packets)
    Function of mapping reflective QoS flow to data bearer for uplink SDAP PDUs (reflective QoS flow to DRB mapping for the UL SDAP PDUs)

For an SDAP layer device, the UE may be configured using a Radio Resource Control (RRC) message as to whether to use a header of the SDAP layer device or to use a function of the SDAP layer device for each PDCP layer device or for each bearer or for each logical channel. When the SDAP header is set, an NAS reflective QoS setup 1-bit indicator of the SDAP header and an AS reflective QoS setup 1-bit indicator may instruct the UE to update or reconfigure mapping information for a QoS flow and data bearer for an uplink and a downlink. The SDAP header may include QoS flow ID information indicating QoS. The QoS information may be used as data processing priority, scheduling information, or the like to smoothly support services.

According to an embodiment of the disclosure, a main function of the NR PDCPs 1*d*-05 and 1*d*-40 may include some of the following functions. Of course, the disclosure is not limited to the following example.

Header compression and decompression function (Header compression and decompression: ROHC only)
    User data transfer function (Transfer of user data)
    In-sequence delivery function (In-sequence delivery of upper layer PDUs)
    Out-of-sequence delivery function (Out-of-sequence delivery of upper layer PDUs)
    Re-ordering function (PDCP PDU reordering for reception)
    Duplication detection function (Duplicate detection of lower layer SDUs)
    Retransmission function (Retransmission of PDCP SDUs)
    Ciphering and deciphering function (Ciphering and deciphering)
    Timer-based SDU discarding function (Timer-based SDU discard in uplink)

According to an embodiment of the disclosure, the reordering of the NR PDCP device may mean a function of reordering PDCP PDUs received from a lower layer, in sequence, based on a PDCP Sequence Number (SN). The reordering function of the NR PDCP device may include at least one of a function of delivering data to a higher layer in a reordered sequence, a function of directly delivering the data without considering the order, a function of recording lost PDCP PDUs through reordering, a function of reporting a state for the lost PDCP PDUs to a transmitting side, and a function of requesting for transmission of the lost PDCP PDUs.

According to an embodiment of the disclosure, a main function of the NR RLCs 1*d*-10 and 1*d*-35 may include some of the following functions. Of course, the disclosure is not limited to the following example.

Data transfer function (Transfer of upper layer PDUs)
    In-sequence delivery function (In-sequence delivery of upper layer PDUs)
    Out-of-sequence delivery function (Out-of-sequence delivery of upper layer PDUs)
    ARQ function (Error Correction through ARQ)
    Concatenation, segmentation, and reassembly function (Concatenation, segmentation and reassembly of RLC SDUs)
    Re-segmentation function (Re-segmentation of RLC data PDUs)
    Reordering function (Reordering of RLC data PDUs)
    Duplication detection function (Duplicate detection)
    Error detection function (Protocol error detection)
    RLC SDU discarding function (RLC SDU discard)
    RLC re-establishment function (RLC re-establishment)

According to an embodiment of the disclosure, the in-sequence delivery of the NR RLC device may mean a function of sequentially delivering RLC SDUs received from a lower layer to a higher layer. The in-sequence delivery function may include at least one of a function in which, when one RLC SDU is originally received by being segmented into several RLC SDUs, the RLC SDUs are reassembled and delivered, a function of reordering the received RLC PDUs according to an RLC SN or a PDCP SN, a function of recording lost RLC PDUs through reordering, a function of transmitting a state for the lost PDCP PDUs to a transmitting side, a function of requesting for transmission of the lost PDCP PDUs, a function in which, when there is a lost RLC SDU, only RLC SDUs ahead of the lost RLC SDU are delivered in sequence to a higher layer, a function in which, when a specific timer expires even if the lost RLC SDU exists, all RLC SDUs received before the timer starts are delivered in sequence to the higher layer, and a function in which, when the specific timer expires even if the lost RLC SDU exists, all RLC SDUs received up to now are delivered in sequence to the higher layer.

In addition, according to an embodiment of the disclosure, the NR RLCs 1*d*-10 and 1*d*-35 may process the RLC PDUs in the order by which the RLC PDUs are received (in the order by which the RLC PDUs are arrived irrespective of the order of sequence numbers) and deliver the RLC PDUs to a PDCP device irrespective of the order (i.e., out-of-sequence delivery), and in case of a segment, may receive segments stored in a buffer or to be received at a later time and reconstruct the segments into one RLC PDU and then process and deliver the RLC PDU to the PDCP device. The NR RLCs 1*d*-10 and 1*d*-35 may not include a concatenation function, and may perform the concatenation function in an NR MAC layer or may replace it with a multiplexing function of an NR MAC layer. Of course, the disclosure is not limited to the above example.

The out-of-sequence delivery function of the NR RLCs 1*d*-10 and 1*d*-35 may include at least one of a function of delivering RLC SDUs received from a lower layer directly to a higher layer irrespective of the order, a function in which, when one RLC SDU is originally received by being segmented into several RLC SDUs, the RLC SDUs are reassembled and delivered, and a function of recording lost RLC PDUs by storing and ordering an RLC SN or PDCP SN of the received RLC PDUs.

According to an embodiment of the disclosure, the NR MACs 1*d*-15 and 1*d*-30 may be coupled to several NR RLC layer devices constructed in one UE, and a main function of the NR MAC may include some of the following functions. Of course, the disclosure is not limited to the following example.

Mapping function (Mapping between logical channels and transport channels)
    Multiplexing and demultiplexing function (Multiplexing/demultiplexing of MAC SDUs)
    Scheduling information reporting function (Scheduling information reporting)

HARQ function (Error correction through HARQ)
Priority handling function between logical channels (Priority handling between logical channels of one UE)
Priority handling function between UEs (Priority handling between UEs by means of dynamic scheduling)
MBMS service identification function (MBMS service identification)
Transport format selection function (Transport format selection)
Padding function (Padding)

According to an embodiment of the disclosure, NR PHY layers 1d-20 and 1d-25 may perform an operation in which channel coding and modulation are performed on a higher layer data and thus an OFDM symbol is created and transmitted through a radio channel or in which demodulation and channel coding are performed on the OFDM symbol received through the radio channel and then are transferred to a higher layer. Of course, the disclosure is not limited to the above example.

Figure 1E:
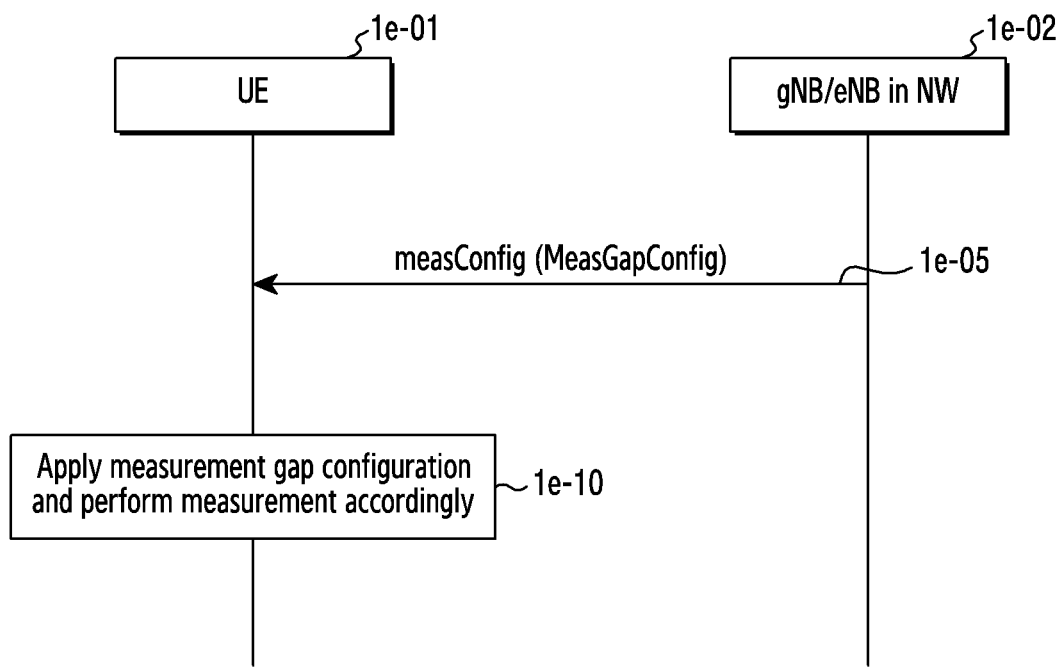
FIG. 1E is a flowchart illustrating a process in which a User Equipment (UE) in an RRC_CONNECTED mode performs measurement based on measurement configuration information configured from a gNodeB (gNB), according to an embodiment of the disclosure.

FIG. 1E is a flowchart illustrating a process in which a UE in an RRC_CONNECTED mode performs measurement based on measurement configuration information configured from a gNB, according to an embodiment of the disclosure.

Referring to FIG. 1E, a UE 1e-01 may receive from a gNB 1e-02 a specific RRC message (e.g., an RRC connection resume message (RRCResume) or an RRC connection reconfiguration message (RRCReconfiguration)) including measurement configuration information (measConfig) (step 1e-05). The measurement configuration information may mean measurement configuration information applied by the UE in the RRC_CONNECTED mode. The measurement configuration information may include measurement gap configuration information (MeasGapConfig). In the MeasGapConfig, gap configuration information (GapConfig) may be set for each Radio Frequency (RF) (e.g., gapFR1 or gapFR2), and UE gap configuration information (gapUE) may be set. At least one of the following parameters may be included in the MeasGapConfig, and each parameter may be defined as follows.

TABLE 1

```
MeasGapConfig ::=           SEQUENCE {
    gapFR2                  SetupRelease { GapConfig }       OPTIONAL,
    -- Need M
    ...,
    [[
    gapFR1                  SetupRelease { GapConfig }       OPTIONAL,
    -- Need M
    gapUE                   SetupRelease { GapConfig }       OPTIONAL
    -- Need M
    ]]
}
GapConfig ::=               SEQUENCE {
    gapOffset               INTEGER (0..159),
    mgl                     ENUMERATED {ms1dot5, ms3, ms3dot5, ms4, ms5dot5, ms6},
    mgrp                    ENUMERATED {ms20, ms40, ms80, ms160},
    mgta                    ENUMERATED {ms0, ms0dot25, ms0dot5},
    ...,
    [[
    refServCellIndicator            ENUMERATED {pCell, pSCell, mcg-FR2}
    OPTIONAL    -- Cond NEDCorNRDC
    ]],
    [[
    refFR2ServCellAsyncCA-r16       ServCellIndex                   OPTIONAL,
    -- Cond AsyncCA
    mgl-r16                         ENUMERATED {ms10, ms20}         OPTIONAL
    -- Cond PRS
    ]]
}
```

TABLE 2 gapFR1
  Indicates measurement gap configuration that applies to FR1 only. In (NG)EN-DC, gapFR1 cannot be set up by NR RRC (i.e. only LTE RRC can configure FR1 measurement gap). In NE-DC, gapFR1 can only be set up by NR RRC (i.e. LTE RRC cannot configure FR1 gap). In NR-DC, gapFR1 can only be set up in the measConfig associated with MCG. gapFR1 can not be configured together with gapUE. The applicability of the FR1 measurement gap is according to Table 9.1.2-2 and Table 9.1.2-3 in TS 38.133 [14].
  gapFR2
  Indicates measurement gap configuration applies to FR2 only. In (NG)EN-DC or NE-DC, gapFR2 can only be set up by NR RRC (i.e. LTE RRC cannot configure FR2 gap). In NR-DC, gapFR2 can only be set up in the measConfig associated with MCG. gapFR2 cannot be configured together with gapUE. The applicability of the FR2 measurement gap is according to Table 9.1.2-2 and Table 9.1.2-3 in TS 38.133 [14].
  gapUE
  Indicates measurement gap configuration that applies to all frequencies (FR1 and FR2). In (NG)EN-DC, gapUE cannot be set up by NR RRC (i.e. only LTE RRC can configure per UE measurement gap). In NE-DC, gapUE can only be set up by NR RRC (i.e. LTE RRC cannot configure per UE gap). In TABLE 2-continued NR-DC, gapUE can only be set up in the measConfig associated with MCG. If gapUE is configured, then neither gapFR1 nor gapFR2 can be configured. The applicability of the per UE measurement gap is according to Table 9.1.2-2 and Table 9.1.2-3 in TS 38.133 [14].
  gapOffset
  Value gapOffset is the gap offset of the gap pattern with MGRP indicated in the field mgrp. The value range is from 0 to mgrp-1.
  mgl
  Value mgl is the measurement gap length in ms of the measurement gap. The measurement gap length is according to in Table 9.1.2-1 in TS 38.133 [14]. Value ms1dot5 corresponds to 1.5 ms, ms3 corresponds to 3 ms and so on. If mgl-r16 is signalled, UE shall use mgl-r16 (with suffix) and ignore the mgl (without suffix).
  mgrp
  Value mgrp is measurement gap repetition period in (ms) of the measurement gap. The measurement gap repetition period is according to Table 9.1.2-1 in TS 38.133 [14].
  mgta
  Value mgta is the measurement gap timing advance in ms. The applicability of the measurement gap timing advance is according to clause 9.1.2 of TS 38.133 [14]. Value ms0 corresponds to 0 ms, ms0dot25 corresponds to 0.25 ms and ms0dot5 corresponds to 0.5 ms. For FR2, the network only configures 0 ms and 0.25 ms.
  refFR2ServCellIAsyncCA
  Indicates the FR2 serving cell identifier whose SFN and subframe is used for FR2 gap calculation for this gap pattern with asynchronous CA involving FR2 carrier(s).
  refServCellIndicator
  Indicates the serving cell whose SFN and subframe are used for gap calculation for this gap pattern. Value pCell corresponds to the PCell, pSCell corresponds to the PSCell, and mcg-FR2 corresponds to a serving cell on FR2 frequency in MCG.

MeasGapConfig may have the following feature. Of course, the disclosure is not limited to the following feature.

As the measurement gap configuration configured by the gNB 1e-02 to the UE 1e-01, whether the gNB will set up or release the GapConfig may be determined. That is, the UE is not able to request the gNB to set up or release the GapConfig.

If the gNB 1e-02 configures the gapUE to the UE 1e-01, it is not possible to configure at least two parameters included in the GapConfig. That is, gapOffset, mgl, mgta, or the like may be set to only one value in the GapConfig.

If the gNB 1e-02 configures the GapConfig to the UE 1e-01 for each gapFR1 and/or gapFR2, it is not possible to configure at least two parameters included in the GapConfig. That is, gapOffset, mgl, mgta, or the like may be set to only one value in each GapConfig.

In step 1e-10, the UE 1e-01 in the RRC_CONNECTED mode may perform measurement by applying the measurement gap configuration information. A time at which the measurement is performed may be determined as follows.

Figure 1F:
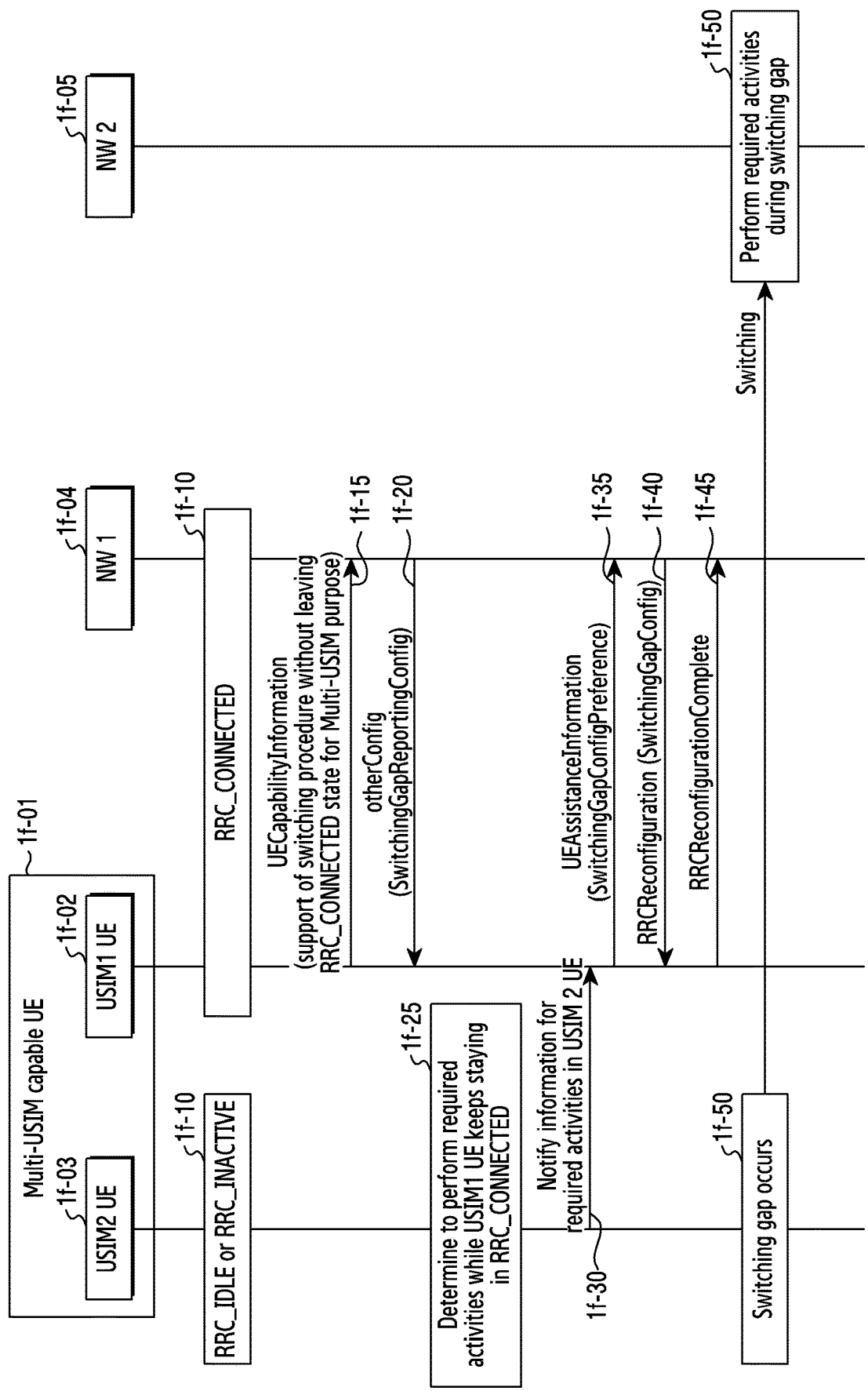
FIG. 1F is a view in which a UE supporting a plurality of Universal Subscriber Identity Modules (USIMs) (i.e., a multi-USIM UE) performs an operation associated with another USIM while maintaining an RRC_CONNECTED mode with a gNB associated with one USIM, according to an embodiment of the disclosure.

If gapFR1 is set to setup:
  ▯ If an FR1 measurement gap configuration is already set up, pre-setup FR1 measurement gap configuration information may be released;
  ▯ The FR1 measurement gap information indicated by the measGapConfig received in step 1e-10 may be set up by considering gapOffset information. Specifically, a first subframe of each gap occurs at a System Frame Number (SFN) and subframe satisfying the following condition 1.
<Condition 1>
  SFN mod T=FLOOR(gapOffset/10);
  subframe=gapOffset mod 10;
  with T=MGRP/10 as defined in TS 38.133;
  ▯ The measurement gap timing advance (mgta) may be applied to a gap occurring when the condition 1 is satisfied. That is, the UE may apply a timing advance specified in the mgta to a timing of the gap occurring when the condition 1 is satisfied. For example, the UE may start measurement earlier by the mgta than gap subframe occurrence;

Otherwise, if gapFR1 is set to release:
  ▯ The FR1 measurement gap configuration may be released;
If gapFR2 is set to setup:
  ▯ If an FR2 measurement gap configuration is already set up, the pre-setup FR2 measurement gap configuration may be released;
  ▯ The FR2 measurement gap information indicated by the measGapConfig received in step 1e-10 may be set up by considering gapOffset information. Specifically, a first subframe of each gap occurs at a System Frame Number (SFN) and subframe satisfying the above condition 1.
  ▯ The mgta may be applied to a gap occurring when the condition 1 is satisfied. That is, the UE may apply a timing advance specified in the mgta to the gap occurring when the condition 1 is satisfied. For example, the UE may start measurement earlier by the mgta than gap subframe occurrence;
Otherwise, if gapFR2 is set to release:
  ▯ The FR2 measurement gap configuration may be released;
If gapUE is set to setup:
  ▯ If a per-UE measurement gap configuration is already set up, the pre-setup per-UE measurement gap configuration may be released;
  ▯ The per-UE measurement gap configuration information indicated by the measGapConfig received in step 1e-10 may be set up by considering gapOffset. Specifically, a first subframe of each gap occurs at a System Frame Number (SFN) and subframe satisfying the above condition 1.
  ▯ The mgta may be applied to a gap occurring when the condition 1 is satisfied. That is, the UE may apply a timing advance specified in the mgta to the gap occurring when the condition 1 is satisfied. For example, the UE may start measurement earlier by the mgta than gap subframe occurrence;
Otherwise, if gapUE is set to release:
  ▯ The per-UE measurement gap configuration may be released;

FIG. 1F is a view in which a UE supporting a plurality of Universal Subscriber Identity Modules (USIMs) (i.e., a multi-USIM UE) performs an operation associated with another USIM while maintaining an RRC_CONNECTED mode with a gNB associated with one USIM, according to an embodiment of the disclosure.

A multi-USIM UE 1f-01 according to an embodiment of the disclosure may include a UE supporting at least two USIMs. In the disclosure, for convenience of explanation, embodiments will be described based on a dual-USIM UE supporting two USIMs. The dual-USIM UE may transmit data or information only to a gNB associated with one USIM at a specific time. On the other hand, the dual-USIM UE may receive data or information from a gNB associated with one USIM at a specific time or may receive data or information simultaneously from gNBs associated with respective USIMs.

Referring to FIG. 1F, the multi-USIM UE 1f-01 may be one UE supporting a plurality of USIMs. For example, the multi-USIM UE may be a USIM1 UE 1f-02 when operating in a USIM 1, and may be a USIM2 UE 1f-03 when operating in a USIM 2. A gNB associated with each USIM may recognize the multi-USIM UE individually for each USIM, instead of recognizing it as one UE. For example, a gNB1 1f-04 may recognize the USIM1 UE 1f-02 as one UE, and a gNB2 1f-05 may recognize the USIM2 UE 1f-03 as one UE. Hereinafter, for convenience of explanation, in embodiments of the disclosure, when the multi-USIM UE 1f-01 performs communication by using the USIM 1, the multi-USIM UE 1f-01 may be referred to as the USIM1 UE 1f-02 or it is referred that the UE uses a first USIM, and when the multi-USIM UE performs communication using the USIM 2, the multi-USIM UE is referred to as the USIM2 UE 1f-03 or it is referred to that the UE uses a second USIM. That is, the multi-USIM UE 1f-01 may be the USIM1 UE 1f-02 or the USIM2 UE 1f-03 according to which USIM is used between the USIM 1 and the USIM 2.

In step 1f-10, the USIM1 UE 1f-02 may be in an RRC_CONNECTED mode by establishing an RRC connection with the gNB1 1f-04. On the other hand, in step 1f-10, the USIM2 UE 1f-03 may not establish an RRC connection with the gNB2 1f-05 and thus may be in an RRC_IDLE mode or an RRC_INACTIVE mode.

In step 1f-15, the USIM1 UE 1f-02 may transmit a UE capability information message (UECapabilityInformation) to the gNB1 1f-04. The UE capability information message may include at least one piece of following information. Of course, the disclosure is not limited to the following example.

An indicator or information element indicating that the USIM1 UE 1f-02 supports a procedure of switching to the USIM2 UE 1f-03 while leaving the RRC_CONNECTED mode from the gNB1 1f-04 (i.e., a support of switching procedure for leaving RRC_CONNECTED state for Multi-USIM purpose) may be included. For example, when the USIM2 UE 1f-03 establishes or resumes an RRC connection with the gNB2 1f-05 and thus has to transition to the RRC_CONNECTED mode, the USIM1 UE 1f-02 may perform a procedure for reporting to the gNB1 1f-04 that it needs to leave the RRC_CONNECTED mode or reporting an RRC state (e.g., an RRC_IDLE mode or an RRC_INACTIVE mode) for transition (i.e., a switching procedure for leaving RRC_CONNECTED state).

An indicator or information element indicating that the USIM1 UE 1f-02 supports a procedure of switching to the USIM2 UE 1f-03 while maintaining the RRC_CONNECTED state with the gNB1 1f-04 (e.g., a support of switching procedure without leaving RRC_CONNECTED state) may be included. For example, a procedure in which the USIM2 UE 1f-03 performs an operation associated with the gNB2 1f-05 while the USIM1 UE 1f-02 maintains the RRC_CONNECTED mode with the gNB1 1f-04 may be referred to as a switching procedure without leaving RRC_CONNECTED state. An indicator or information element may be included to indicate that the USIM1 UE 1f-02 supports a switching gap required to perform communication with the gNB2 1f-05 by switching to the USIM2 UE 1f-03 while maintaining the RRC_CONNECTED mode with the gNB1 1f-04.

The switching gap may include a per-UE level switching gap. If the USIM1 UE 1f-02 supports a per-FR or per-frequency switching gap, an additional indicator or information element indicating information on a support for the per-FR or per-frequency gap may be included in the UE capability information message.

In step 1f-20, the gNB1 1f-04 may transmit a specific RRC message (e.g., an RRCReconfiguration message or an RRCResume message or a new RRC message) including configuration information (SwitchingGapReportingConfig) allowing the USIM1 UE 1f-02 to report switching gap information preferred/required for a multi-USIM operation. In addition, the SwitchingGapReportingConfig may be contained in otherConfig. The SwitchingGapReportingConfig may be configuration information associated with the switching procedure without leaving RRC_CONNECTED state. The SwitchingGapReportingConfig may include at least one of the followings.

An indicator or information element (e.g., SetupRelease) for configurating whether the gNB1 1f-04 is allowed to transmit preferred switching gap configuration information in order for the USIM2 UE 1f-03 to perform an operation associated with the gNB2 1f-05 while the USIM1 UE 1f-02 maintains the RRC_CONNECTED mode with the gNB1 1f-04.

A new prohibit timer value.
If the gNB1 1f-04 configures or sets up the prohibit timer value to the USIM1 UE 1f-02, the USIM1 UE 1f-02 may start a new timer with the new prohibit timer value when initiating a procedure for sending preferred switching gap configuration information to the gNB1 1f-04 and may transmit a specific RRC message including the preferred switching gap configuration information to the gNB1 1f-04. If the new prohibit timer is running, the USIM1 UE 1f-02 may not be able to transmit the specific RRC message included in the preferred switching gap configuration information to the gNB1 1f-04. That is, if the new prohibit timer is not running or expires, the USIM1 UE 1f-02 may transmit the specific RRC message including the preferred switching gap configuration information to the gNB1 1f-04.

In step 1f-25, the USIM2 UE 1f-03 may determine whether to perform a specific operation in the RRC_IDLE mode or the RRC_INACTIVE mode. The specific operation is an operation of the USIM2 UE 1f-03 in association with the gNB2 1f-05, and may mean at least one of the followings. Of course, the disclosure is not limited to the following example.

Operation 1: The USIM2 UE 1f-03 does not perform an RRC connection establishment procedure and the RRC connection resume procedure with respect to the gNB2 1f-05, but performs an operation of receiving a signal transmitted by the gNB2 1f-05 or an internal operation of the USIM2 UE through reception. For example,

- The USIM2 UE 1f-03 may perform paging channel or short message monitoring associated with the gNB2 1f-05. For example, the USIM2 UE 1f-03 may monitor a paging occasion every Discontinuous Reception (DRX) cycle.
- The USIM2 UE 1f-03 may perform monitoring for receiving a system information change notification associated with the gNB2 1f-05. For example, the USIM2 UE 1f-03 may monitor a paging occasion every DRX cycle.
- The USIM2 UE 1f-03 may perform a cell selection or cell reselection evaluation procedure. For example, the USIM2 UE may measure a serving cell or a neighboring cell as a part of the cell selection or cell reselection evaluation procedure.
- The USIM2 UE 1f-03 may perform a Public Land Mobile Network (PLMN) selection procedure.

Operation 2: The USIM2 UE 1f-03 does not perform an RRC connection establishment procedure and the RRC connection resume procedure with respect to the gNB2 1f-05, but performs transmission/reception with respect to the gNB2 1f-05. For example,

- The USIM2 UE 1f-03 requests the gNB2 1f-05 for on-demand system information to obtain system information in an on-demand manner Operation 3: The USIM2 UE 1f-03 in the RRC_INACTIVE mode performs an RRC connection resume procedure with respect to the gNB2 1f-05 but is not able to transition to the RRC_CONNECTED mode. For example,

- The USIM2 UE 1f-03 receives a RAN paging message transmitted by the gNB2 1f-05, and the received RAN paging message includes a UE identifier (I-RNTI) indicating the USIM2 UE 1f-03. However, when the USIM1 UE 1f-02 has to persistently perform data transmission/reception with the gNB1 1f-04, the USIM2 UE 1f-03 may transmit to the gNB2 1f-05 an RRCResumeRequest/1 message containing a busy indication indicating that it is not possible to respond to the RAN paging message received from the gNB2 1f-05. According to an embodiment of the disclosure, the busy indication may be contained in resumeCause. In response thereto, the gNB2 1f-05 may transmit an RRCReject or RRCRelease message to the USIM2 UE 1f-03.

Operation 4: The USIM2 UE 1f-03 may transition to the RRC_CONNECTED mode by performing an RRC connection establishment or resume procedure with respect to the gNB2 1f-05. For example,

- The USIM2 UE 1f-03 may perform a registration update procedure or a RAN notification area update procedure.

The aforementioned operation may mean a periodic operation or an aperiodic operation or a one-shot operation.

In step 1f-30, the USIM2 UE 1f-03 may inform the USIM1 UE 1f-02 of information required to perform the operation described above in step 1f-25 in the RRC_IDLE mode or the RRC_INACTIVE mode. For reference, step 1f-30 may be an operation performed inside the multi-USIM UE 1f-01. That is, step 1f-30 does not require separate communication with the gNB, and is implemented only inside the multi-USIM UE 1f-01. This step means data processing performed inside the multi-USIM UE 1f-01, and may not be an essential step.

In step 1f-35, the USIM1 UE 1f-02 may transmit to the gNB1 1f-04 a specific RRC message (e.g., a UEAssistanceInformation message or a new RRC message) containing configuration information (SwitchingGapConfigPreference) for one or a plurality of preferred switching gap patterns. SwitchingGapConfigPreference may mean configuration information different from the measurement configuration information (MeasConfig) of the aforementioned embodiment. Specifically,

- SwitchingGapConfigPreference is switching gap configuration information requested by being transmitted by the USIM1 UE 1f-02 to the gNB1 1f-04 in order for the USIM2 UE 1f-03 to perform the specific operation described above in step 1f-30. That is, it is configuration information for one or a plurality of preferred switching gap patterns transmitted by the USIM1 UE 1f-02 to the gNB1 1f-04 for a multi-USIM operation. In the disclosure, the switching gap (pattern) may be referred to as a MUSIM gap (pattern).
- SwitchingGapConfigPreference may include one or a plurality of switching gap patterns preferred by the USIM1 UE 1f-02 according to an operation necessary in step 1f-25. That is, one or a plurality of pieces of switching gap pattern information preferred for each USIM1 UE 1f-02 may be included in the SwitchingGapConfigPreference. For example, a list containing one or a plurality of pieces of MUSIM-GapInfo-r17 may be included in the SwitchingGapConfigPreference.
- Each piece of switching gap pattern information may be periodic switching gap pattern information or may be one-shot/aperiodic switching gap pattern information. The disclosure proposes that the USIM1 UE 1f-02 includes a switching gap repetition period (a switching gap repetition period value, musim-GapRepetitionPeriod) when periodic switching gap pattern information is preferred, and includes musim-GapStartSFN (an SFN value for starting a switching gap) when periodic/one shot switching gap pattern information is preferred. The USIM1 UE 1f-02 includes the musim-GapStartSFN in the aperiodic/one shot switching gap pattern information because the SNF value is not derived without the switching gap repetition period value in the equation of the condition 1 of the aforementioned embodiment. In addition, at least one of the following parameters may be commonly included in the periodic switching gap pattern and the aperiodic/one shot switching gap pattern.
  - switching gap length (musim-GapLength): a value (ms) indicating a length of a switching gap (musim gap) preferred by the USIM1 UE 1f-02.
  - switching gap offset (musim-GapOffset): a value indicating a gap offset of the switching gap (musim gap) preferred by the USIM1 UE 1f-02.
  - switching gap timing advance: a value (ms) indicating a timing advance (musim gap timing advance) of the switching gap preferred by the USIM1 UE 1f-02
  - refServCellIndicator: a value indicating a serving cell. This may be used by the USIM1 UE 1f-02 to indicate one of PCell, PS Cell, and SCell for the purpose of calculating a gap of a switching gap pattern through an SFN and subframe of a serving cell. Of course, when there is no refServCellIndicator or when a field of refServCellIndicator is not defined, the USIM1 UE 1f-02 may always calculate the gap of the switching gap pattern through an SFN and subframe of the PCell.

For example, each piece of switching gap pattern information may have the structure of ASN.1 as follows.

```
MUSIM-GapInfo-r17 ::=    SEQUENCE {
    musim-GapOffset-r17         ENUMERATED {FFS},
    musim-GapLength-r17         ENUMERATED {FFS},
    musim-GapType-r17           CHOICE {
        musim-GapRepetitionPeriod-r17   ENUMERATED {FFS}
        musim-GapStartSFN-r17       ENUMERATED {FFS}
    }
}
```

Regarding the periodic switching gap pattern information preferred by the USIM1 UE 1*f*-02, based on the PCell or a cell indicated by refServCellIndicator, a first subframe in which each switching gap (musim gap) occurs may mean an SFN and subframe which satisfies the condition 1 below.

<Condition 1>
SFN mod T=FLOOR(musim-GapOffset/10);
subframe=musim-gapOffset mod 10;
with T=musim-GapRepetitionPeriod/10 as defined in TS 38.133;

The switching gap timing advance may be applied to the gap occurring when the condition 1 is satisfied. That is, the UE may apply a timing advance indicated by the switching gap timing advance for a timing of the gap occurring when the condition 1 is satisfied. For example, the UE may start measurement earlier by the switching gap timing advance than gap subframe occurrence. For reference, the constant 10 in the condition 1 is for exemplary purposes only, and other constants such as 2, 5, 100, etc., may also be possible.

Regarding aperiodic/one-shot switching gap pattern information preferred by the USIM1 UE 1*f*-02, based on the PCell or the cell indicated by refServCellIndicator, a first subframe in which each switching gap (musim gap) occurs may mean an SFN and subframe which satisfies the condition 2 below.

<Condition 2>
SFN=musim-GapStartSFN (an SFN value for starting a switching gap)
subframe=musim-GapOffset mod 10;

The switching gap timing advance may be applied to the gap occurring when the condition 2 is satisfied. That is, the UE may apply a timing advance indicated by the switching gap timing advance for a timing of the gap occurring when the condition 2 is satisfied. For example, the UE may start measurement earlier by the m switching gap timing advance than gap subframe occurrence. For reference, the constant 10 in the condition 1 is for exemplary purposes only, and other constants such as 2, 5, 100, etc., may also be possible.

Alternatively, the USIM1 UE 1*f*-02 may include not musim-GapOffset but an actual starting subframe value in the aperiodic/one-shot switching gap pattern information. In this case, the condition 2 may be expressed as follows.

<Condition 2-1>
SFN=musim-GapStartSFN (an SFN value for starting a switching gap)
subframe=musim-GapStartsubframe;

In step 1*f*-35, when at least one of the following conditions is satisfied, the USIM1 UE 1*f*-02 may transmit to the gNB1 1*f*-04 a specific RRC message including SwitchingGapConfigPreference.

Condition 1: This is a case where, after the SwitchingGapReportingConfig is configured in step 1*f*-20, the specific RRC message including the SwitchingGap-ConfigPreference is not transmitted, and at least one new MUSIM gap is required. In this case, the new MUSIM gap may include both the periodic musim gap and the aperiodic/one-shot musim gap.

Condition 2: This is a case where the currently preferred SwitchingGapConfigPreference is different from the most recently sent SwitchingGapConfigPreference. In this case, the USIM1 UE 1*f*-02 may determine whether the condition 2 is satisfied by considering only the periodic MUSIM gap. Of course, the USIM1 UE 1*f*-02 may determine whether the condition 2 is satisfied by considering both the periodic MUSIM gap and the aperiodic/one-shot MUSIM gap. The USIM1 UE 1*f*-02 determines whether the condition 2 is satisfied by considering only the periodic MUSIM gap because the aperiodic/one-shot MUSIM gap is a MUSIM gap which will not be used later after it is used once, as it is implied by a terminology (this is known to both the USIM1 UE 1*f*-02 and the gNB1 1*f*-04), and thus there is an advantage in that the USIM1 UE 1*f*-02 does not necessarily have to transmit UEAssistanceInformation to the gNB1 1*f*-04 to request the gNB1 1*f*-04 to release the aperiodic/one-shot MUSIM gap. In addition, the USIM1 UE 1*f*-02 may determine whether the condition 2 is satisfied only if a new prohibit timer is not running. In addition, when the condition 2 is satisfied, the USIM1 UE 1*f*-02 may not include an unnecessary MUSIM gap in the SwitchingGapConfigPreference among MUSIM gaps configured from the gNB1 1*f*-04. That is, the USIM1 UE 1*f*-02 may implicitly inform the gNB1 1*f*-04 of a MUSIM gap which is no longer required.

For reference, in step 1*f*-35, if a new prohibit value is set in step 1*f*-20, the USIM1 UE 1*f*-02 may start or restart a new timer with the value, and may transmit to the gNB1 1*f*-04 a specific RRC message including SwitchingGapConfigPreference.

In step 1*f*-40, the gNB1 may transmit a specific RRC message (e.g., an RRCReconfiguration or RRCResume or new RRC message) containing one or a plurality of pieces of switching gap configuration information (SwitchingGapConfig or MUSIMGapConfig) based on SwitchingGapConfigPreference requested by the USIM1 UE 1*f*-02 in response to step 1*f*-35. Specifically, the gNB1 1*f*-04 may transmit to the USIM1 UE 1*f*-02 a specific RRC message including MUSIMGapConfig, based on SwitchingGapConfigPreference received in step 1*f*-35. In the disclosure, the gNB1 1*f*-04 may configure the MUSIMGapConfig to the USIM1 UE 1*f*-02 through at least one of the following methods.

Method 1: MUSIM-GapId list for indicating that it is set to actual MUSIM gap

MUSIM-GapId=1 may mean a first MUSIM Gap included in SwitchingGapConfigPreference, MUSIM-GapId=2 may mean a second MUSIM Gap included in SwitchingGapConfigPreference, and MUSIM-GapId=3 may mean a third MUSIM Gap included in SwitchingGapConfigPreference. Therefore, if MUSIM-GapId=1 and MUSIM-GapId=3 are included in MUSIMGapConfig, the gNB1 1*f*-04 may instruct the USIM1 UE 1*f*-02 to configure the first MUSIM Gap and third MUSIM Gap included in SwitchingGapConfigPreference. That is, it may mean that the second MUSIM Gap included in SwitchingGapConfigPreference is not usable by the USIM1 UE 1*f*-02.

For example, MUSIMGapConfig according to the method 1 may have the structure of ANS.1 as follows.

```
MUSIM-GapConfig-r17 ::= SEQUENCE {
    musim-GapUE-r17    SEQUENCE (SIZE (1..FFS)) OF MUSIM-GapId
OPTIONAL    -- Need R
}
```

Method 2: Configuration information of an actual MUSIM Gap and MUSIM-GapId mapped thereto are included together through ToAddMostList and ToReleaseList The gNB1 1f-04 may include configuration information for each MUSIM Gap and a MUSIM-Gap Id mapped thereto in MUSIMGapConfig as follows, based on SwitchingGapConfigPreference received in step 1f-35. In this case, each MUSIM-Gap included in the MUSIMGapConfig may be actually set to a value different from the preferred MUSIM-Gap included in the SwitchingGapConfigPreference.

For example, the MUSIMGapConfig according to the method 2 may have the structure of ASN.1 as follows.

```
MUSIM-GapConfig-r17 ::=                SEQUENCE {
    musim-GapUEToAddModList-r17                SEQUENCE (SIZE
(1..FFS)) OF MUSIM-Gap          OPTIONAL,   --Need N
    musim-GapUEToReleaseList-r17               SEQUENCE (SIZE
(1..FFS)) OF MUSIM-GapId        OPTIONAL    -- Need N
}
MUSIM-Gap    ::=   SEQUENCE {
    musim-GapId              ,
        musim-GapOffset-r17              ENUMERATED {FFS},
        musim-GapLength-r17              ENUMERATED {FFS},
        musim-GapType-r17                CHOICE {
            musim-GapRepetitionPeriod-r17         ENUMERATED {FFS}
            musim-GapStartSFN-r17                 ENUMERATED {FFS}
}
...
```

In step 1f-45, the USIM1 UE 1f-02 may transmit a specific RRC message to the gNB1 1f-04 in response to the specific RRC message received in step 1f-40. For example, the specific RRC message may mean an RRCReconfigurationComplete or RRCResumeComplete or new RRC message or the like.

In step 1f-50, the USIM1 UE 1f-02 may determine whether one or a plurality of switching gaps occur through the SwitchingGapConfig received and applied in step 1f-40. For example, If SwitchingGapConfig is set to setup:
    [] If SwitchingGapConfig is already set up, pre-setup SwitchingGapConfig may be released;
    [] One or a plurality of switching gap patterns indicated by the SwitchingGapConfig received in step 1f-40 may be set up. Specifically, if each switching gap is a periodic MUSIM gap, a first subframe in which a corresponding gap occurs may be an SFN and subframe satisfying the aforementioned condition 1. If each switching gap is an aperiodic/one-shot MUSIM gap, a first subframe in which a corresponding gap occurs may be an SFN and subframe satisfying the aforementioned condition 2.
    [] A switching gap timing advance configured in each switching gap may be applied to each switching gap occurring when the condition 1 or the condition 2 is satisfied.
    [] The USIM2 UE 1f-03 may perform a specific operation by a switching length configured in each switching gap from gap subframe occurrence.

If SwitchingGapConfig is set to release, one or a plurality of gap patterns related in SwitchingGapConfig may be released;

If each switching gap occurs in step 1f-50, the USIM2 UE 1f-03 may perform at least one of the aforementioned operations of step 1f-25 during a switching gap length from a time at which the switching gap occurs in step 1f-50. In this case, the USIM1 UE 1f-02 may maintain an RRC_CONNECTED mode with the gNB1 1f-04.

Figure 1G:
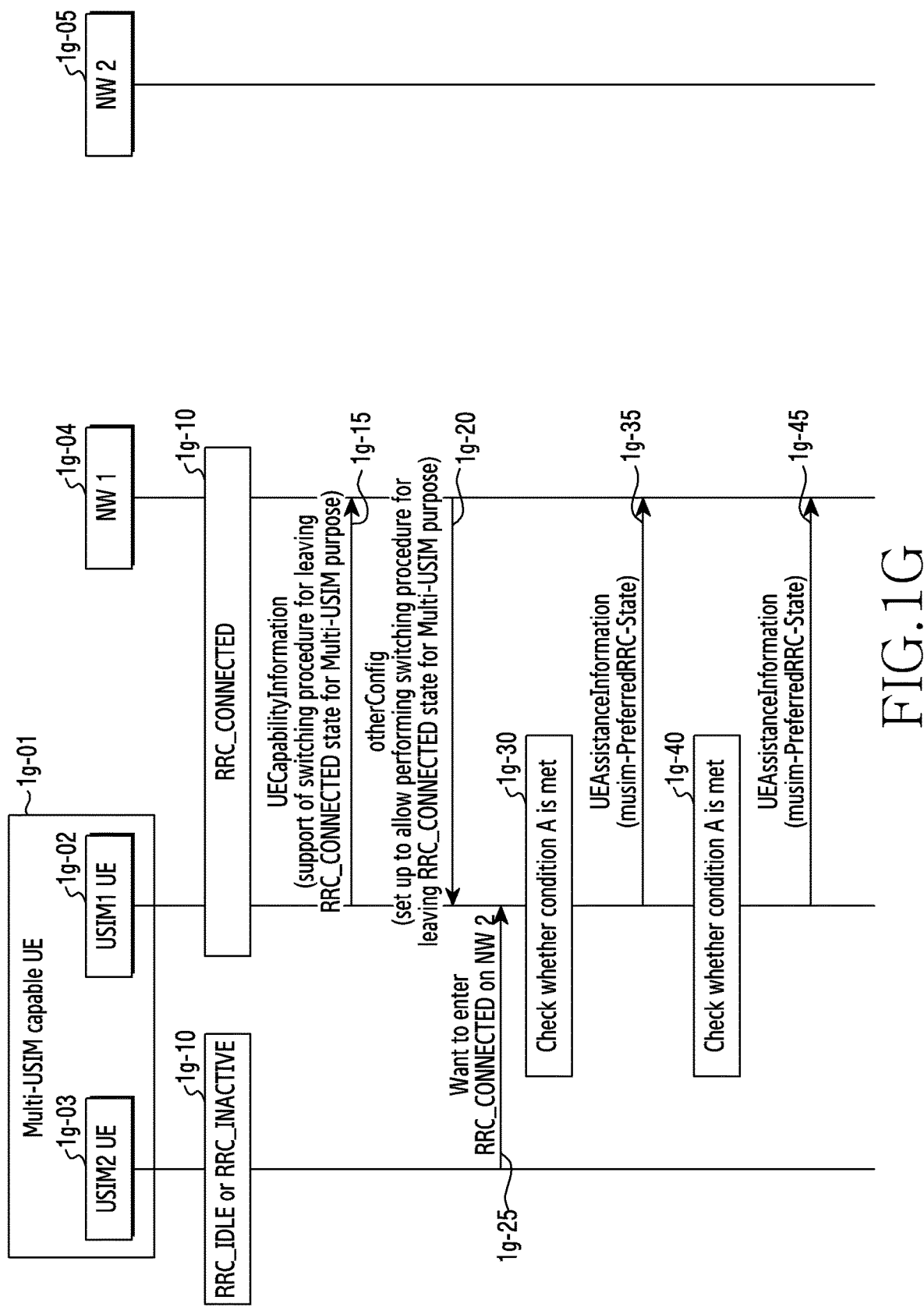
FIG. 1G is a view in which a UE supporting a plurality of USIMs (i.e., a multi-USIM UE) performs an operation associated with another USIM by releasing an RRC_CONNECTED mode with a gNB associated with one USIM, according to an embodiment of the disclosure.

FIG. 1G is a view in which a UE supporting a plurality of USIMs (i.e., a multi-USIM UE) performs an operation associated with another USIM by releasing an RRC_CONNECTED mode with a gNB associated with one USIM, according to an embodiment of the disclosure.

A multi-USIM UE 1g-01 according to an embodiment of the disclosure may include a UE supporting at least two USIMs. In the disclosure, for convenience of explanation, embodiments will be described based on a dual-USIM UE supporting two USIMs. The dual-USIM UE may transmit data or information only to a gNB associated with one USIM at a specific time. On the other hand, the dual-USIM UE may receive data or information from a gNB associated with one USIM at a specific time or may receive data or information simultaneously from gNBs associated with respective USIMs.

Referring to FIG. 1G, the multi-USIM UE 1g-01 may be one UE supporting a plurality of USIMs. For example, the multi-USIM UE may be a USIM1 UE 1g-02 when operating in a USIM 1, and may be a USIM2 UE 1g-03 when operating in a USIM 2. A gNB associated with each USIM may recognize the multi-USIM UE individually for each USIM, instead of recognizing it as one UE. For example, a gNB1 1g-04 may recognize the USIM1 UE 1g-02 as one UE, and a gNB2 1g-05 may recognize the USIM2 UE 1g-03 as one UE. Hereinafter, for convenience of explanation, in embodiments of the disclosure, when the multi-USIM UE performs communication by using the USIM 1, the multi-USIM UE 1g-01 may be referred to as the USIM1 UE 1g-02 or it is referred that the UE uses a second USIM, and when the multi-USIM UE performs communication using the USIM 2, the multi-USIM UE 1g-01 is referred to as the USIM2 UE 1g-03 or it is referred to that the UE uses a second USIM. That is, the multi-USIM UE 1g-01 may be the USIM1 UE 1g-02 or the USIM2 UE 1g-03 according to which USIM is used between the USIM 1 and the USIM 2.

In step 1g-10, the USIM1 UE 1g-02 may be in an RRC_CONNECTED mode by establishing an RRC connection with the gNB1 1g-04. On the other hand, in step 1g-10, the USIM2 UE 1g-03 may not establish an RRC connection with the gNB2 1g-05 and may be in an RRC_IDLE mode or an RRC_INACTIVE mode.

In step 1g-15, the USIM1 UE 1g-02 may transmit a UE capability information message (UECapabilityInformation) to the gNB1 1g-04. The UE capability information message may include at least one piece of following information. Of course, the disclosure is not limited to the following example.

An indicator or information element indicating that the USIM1 UE 1g-02 supports a procedure of switching to the USIM2 UE 1g-03 while leaving the RRC_CONNECTED mode from the gNB1 1g-04 (i.e., a support of switching procedure for leaving RRC_CONNECTED state) may be included. For example, when the USIM2 UE 1g-03 establishes or resumes an RRC connection with the gNB2 1g-05 and thus transitions to the RRC_CONNECTED mode, the USIM1 UE 1g-02 may perform a procedure for reporting to the gNB1 1g-04 that it needs to leave the RRC_CONNECTED mode or reporting a preferred RRC state (e.g., an RRC_IDLE mode or an RRC_INACTIVE mode or an RRC_CONNECTED mode) (i.e., a switching procedure for leaving RRC_CONNECTED state).

In step 1g-20, the gNB1 1g-04 may configure the USIM1 UE 1g-02 to perform a switching procedure for leaving RRC_CONNECTED state. For example, through the RRCReconfiguration message containing other Config, the gNB1 1g-04 may configure the USIM1 UE 1g-02 to perform the switching procedure for leaving RRC_CONNECTED state. In addition, the gNB1 1g-04 may include a new timer value musim-LeaveWithoutResponseTimer in otherConfig. The value musim-LeaveWithoutResponseTimer is used to allow the USIM1 UE 1g-02 to transition to the RRC_IDLE state autonomously without a response of the gNB, and a specific UE operation may be as follows.

If the USIM1 UE 1g-02 is configured to perform a switching procedure for leaving RRC_CONNECTED state from the gNB1 1g-04 and thus needs to leave the RRC_CONNECTED state, the USIM1 UE 1g-02 may initiate a UEAssistanceInformation procedure to transmit to the gNB1 1g-04 a UEAssistanceInformation message including a musim-PreferredRRC-state. For this, if the USIM1 UE 1g-02 initiates the UEAssistanceInformation procedure, the value musim-LeaveWithoutResponseTimer configured from the gNB1 1g-04 may be used to start a timer T3xx. The USIM1 UE 1g-02 may stop the running timer T3xx if a specific RRC message (e.g., RRCRelease) is received from the gNB1 1g-04. The USIM1 UE 1g-02 may automatically transition to the RRC_IDLE state if the specific RRC message is not received from the gNB1 1g-04 and thus the running timer T3xx expires.

In step 1g-25, the USIM2 UE 1g-03 may report this to the USIM1 UE 1g-02 in order to establish or resume an RRC connection with the gNB2 1g-05.

In step 1g-30, the USIM1 UE 1g-02 configured to perform the switching procedure for leaving RRC_CONNECTED state from the gNB1 1g-04 may determine whether the following condition A is satisfied.

Condition A: If the USIM1 UE 1g-02 needs to leave the RRC_CONNECTED state due to the multi-USIM operation.

In step 1g-35, when the condition A is satisfied, the USIM1 UE 1g-02 may initiate the UEAssistanceInformation procedure to transmit a UEAssistanceInformation message including musim-PreferredRRC-state. In addition, if a value musim-LeaveWithoutResponseTimer is configured from the gNB1 1g-04, the USIM1 UE 1g-02 may start a timer T3xx with the value musim-LeaveWithoutResponseTimer. In addition, the USIM1 UE 1g-02 may transmit to the gNB1 1g-04 the UEAssistanceInformation message including musim-PreferredRRC-state. The musim-PreferredRRC-State may mean a value of at least one of IDLE, INACTIVE, and OutOfConnected. IDLE may indicate that the USIM1 UE 1g-02 prefers to transition to RRC_IDLE. INACTIVE may indicate that the USIM1 UE 1g-02 prefers to transition to RRC_INACTIVE. OutOfConnected may indicate the USIM1 UE 1g-02 prefers to leave RRC_CONNECTED without preferring the transition to RRC_IDLE or RRC_INACTIVE.

In step 1g-40, the USIM1 UE 1g-02 in the RRC_CONNECTED mode (e.g., it may be in the RRC_CONNECTED mode since a specific message (e.g., RRCRelease) is not received from the gNB1 1g-04) may be configured to perform the switching procedure for leaving RRC_CONNECTED state from the gNB1 1g-04 and may determine whether the following condition A is satisfied.

Condition A: If the USIM1 UE 1g-02 needs to leave the RRC_CONNECTED state due to the multi-USIM operation.

In step 1g-45, when the condition A is satisfied, the USIM1 UE 1g-02 may initiate the UEAssistanceInformation procedure to transmit a UEAssistanceInformation message including musim-PreferredRRC-state. That is, the USIM1 UE 1g-02 may perform step 1g-45 according to step 1g-35.

In the disclosure, although the USIM1 UE 1g-02 configured to perform the switching procedure for leaving RRC_CONNECTED state from the gNB1 1g-04 has successfully transmitted to the gNB1 1g-04 the UEAssistanceInformation message including musim-PreferredRRC-state, it may be in the RRC_CONNECTED mode since a specific message (e.g., RRCRelease) is not received from the gNB1 1g-04. However, if it needs to leave the RRC_CONNECTED mode due to the multi-USIM operation, the USIM1 UE 1g-02 unnecessarily transmits the UEAssistanceInformation message including musim-PreferredRRC-state persistently to the gNB1 1g-04.

Figure 1H:
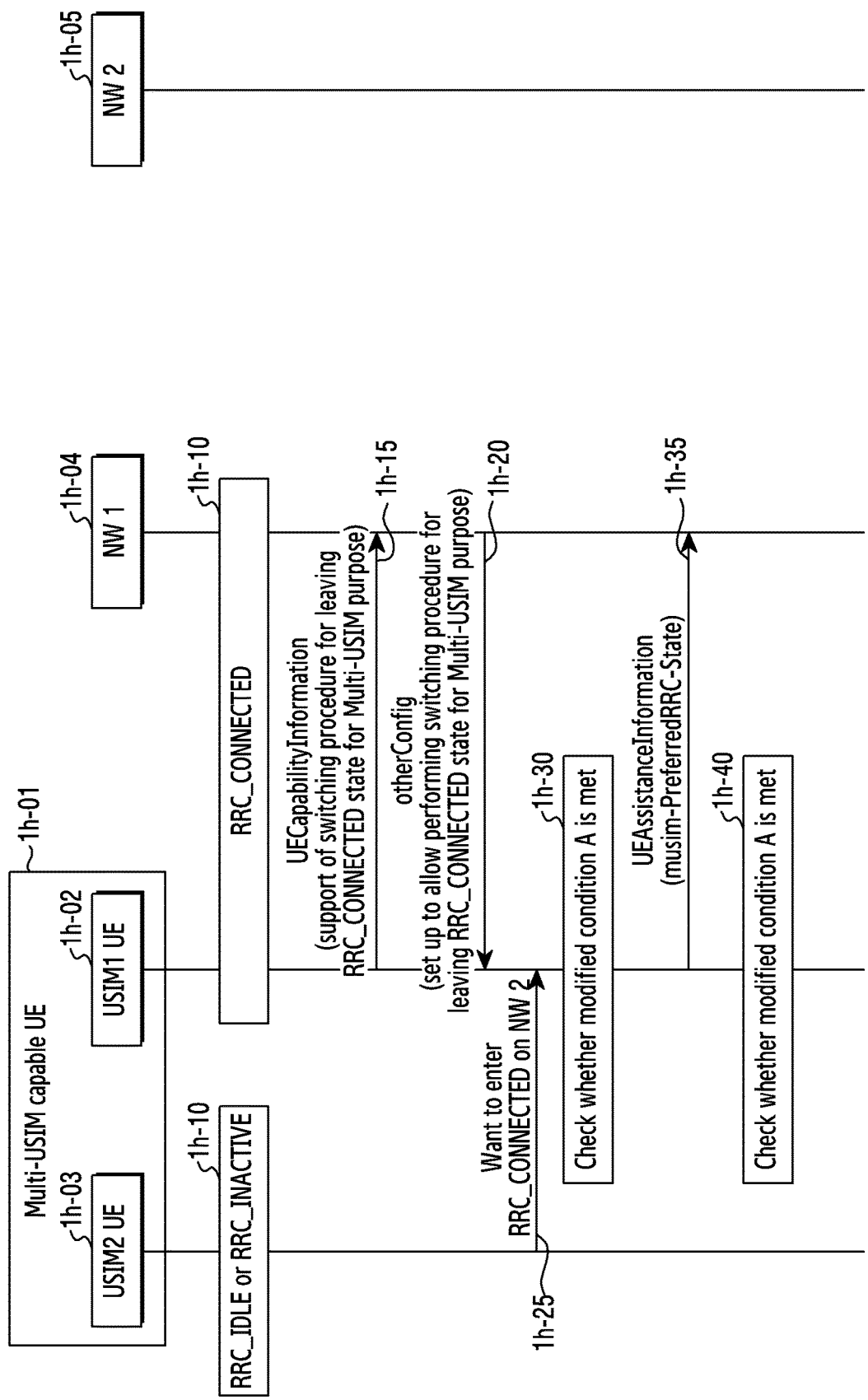
FIG. 1H is a view in which a UE supporting a plurality of USIMs (i.e., a multi-USIM UE) performs an operation associated with another USIM by releasing an RRC_CONNECTED mode from a gNB associated with one USIM, according to an embodiment of the disclosure.

FIG. 1H is a view in which a UE supporting a plurality of USIMs (i.e., a multi-USIM UE) performs an operation associated with another USIM by releasing an RRC_CONNECTED mode from a gNB associated with one USIM, according to an embodiment of the disclosure.

A multi-USIM UE 1h-01 according to an embodiment of the disclosure may include a UE supporting at least two USIMs. In the disclosure, for convenience of explanation, embodiments will be described based on a dual-USIM UE supporting two USIMs. The dual-USIM UE may transmit data or information only to a gNB associated with one USIM at a specific time. On the other hand, the dual-USIM UE may receive data or information from a gNB associated with one USIM at a specific time or may receive data or information simultaneously from gNBs associated with respective USIMs.

Referring to FIG. 1H, the multi-USIM UE 1h-01 may be one UE supporting a plurality of USIMs. For example, the multi-USIM UE may be a USIM1 UE 1h-02 when operating in a USIM 1, and may be a USIM2 UE 1h-03 when operating in a USIM 2. A gNB associated with each USIM may recognize the multi-USIM UE 1h-01 individually for each USIM, instead of recognizing it as one UE. For example, a gNB1 1h-04 may recognize the USIM1 UE 1h-02 as one UE, and a gNB2 1h-05 may recognize the USIM2 UE 1h-03 as one UE. Hereinafter, for convenience of explanation, in embodiments of the disclosure, when the multi-USIM UE 1h-01 performs communication by using the USIM 1, the multi-USIM UE 1h-01 may be referred to as the USIM1 UE 1h-02 or it is referred that the UE uses a first USIM, and when the multi-USIM UE 1h-01 performs communication using the USIM 2, the multi-USIM UE is referred to as the USIM2 UE 1h-03 or it is referred to that the UE uses a second USIM. That is, the multi-USIM UE may be the USIM1 UE 1h-02 or the USIM2 UE 1h-03 according to which USIM is used between the USIM 1 and the USIM 2.

In step 1h-10, the USIM1 UE 1h-02 may be in an RRC_CONNECTED mode by establishing an RRC connection with the gNB1 1h-04. On the other hand, in step 1h-10, the USIM2 UE 1h-03 may not establish an RRC connection with the gNB2 1h-05 and may be in an RRC_IDLE mode or an RRC_INACTIVE mode.

In step 1h-15, the USIM1 UE 1h-02 may transmit a UE capability information message (UECapabilityInformation) to the gNB1 1h-04. The UE capability information message may include at least one piece of following information. Of course, the disclosure is not limited to the following example.

An indicator or information element indicating that the USIM1 UE 1h-02 supports a procedure of switching to the USIM2 UE 1h-03 while leaving the RRC_CONNECTED mode from the gNB1 1h-04 (i.e., a support of switching procedure for leaving RRC_CONNECTED state) may be included. For example, when the USIM2 UE 1h-03 establishes or resumes an RRC connection with the gNB2 1h-05 and thus transitions to the RRC_CONNECTED mode, the USIM1 UE 1h-02 may perform a procedure for reporting to the gNB1 1h-04 that it needs to leave the RRC_CONNECTED mode or reporting a preferred RRC state (e.g., an RRC_IDLE mode or an RRC_INACTIVE mode or an RRC_CONNECTED mode) (i.e., a switching procedure for leaving RRC_CONNECTED state).

In step 1h-20, the gNB1 1h-04 may configure the USIM1 UE 1h-02 to perform a switching procedure for leaving RRC_CONNECTED state. For example, through the RRCReconfiguration message containing other Config, the gNB1 1h-04 may configure the USIM1 UE 1h-02 to perform the switching procedure for leaving RRC_CONNECTED state. In addition, the gNB1 1h-04 may include a new timer value musim-LeaveWithoutResponseTimer in otherConfig. The value musim-LeaveWithoutResponseTimer is used to allow the USIM1 UE 1h-02 to transition to the RRC_IDLE state autonomously without a response of the gNB, and a specific UE operation may be as follows.

If the USIM1 UE 1h-02 is configured to perform a switching procedure for leaving RRC_CONNECTED state from the gNB1 1h-04 and thus needs to leave the RRC_CONNECTED state, the USIM1 UE 1h-02 may initiate a UEAssistanceInformation procedure to transmit to the gNB1 1h-04 a UEAssistanceInformation message including a musim-PreferredRRC-state. For this, if the USIM1 UE 1h-02 initiates the UEAssistanceInformation procedure, a value musim-LeaveWithoutResponseTimer configured from the gNB1 1h-04 may be used to start a timer T3xx. The USIM1 UE 1h-02 may stop the running timer T3xx if a specific RRC message (e.g., RRCRelease) is received from the gNB1 1h-04. The USIM1 UE 1h-02 may automatically transition to the RRC_IDLE state if the specific RRC message is not received from the gNB1 1h-04 and thus the running timer T3xx expires.

In step 1h-25, the USIM2 UE 1h-03 may report this to the USIM1 UE 1h-02 in order to establish or resume an RRC connection with the gNB2 1h-05.

In step 1h-30, the USIM1 UE configured to perform the switching procedure for leaving RRC_CONNECTED state from the gNB1 1h-04 may determine whether the following condition A is satisfied.

Modified condition A: This is a case where the USIM1 UE 1h-02 needs to leave the RRC_CONNECTED mode due to the multi-USIM operation, and does not transmit to the gNB1 1h-04 the UEAssistanceInformation message including musim-PreferredRRC-state after being configured to perform the switching procedure for leaving RRC_CONNECTED state.

Alternatively, the modified condition A may mean at least one of the followings.

If the USIM1 UE 1h-02 needs to leave the RRC_CONNECTED mode due to the multi-USIM operation and the timer T3xx is not running or if the USIM1 UE 1h-02 needs to leave the RRC_CONNECTED mode due to the multi-USIM operation and the value musim-LeaveWithoutResponseTimer is configured but the timer Tx33 is not running If the USIM1 UE 1h-02 needs to leave the RRC_CONNECTED mode due to the multi-USIM operation, the value musim-LeaveWithoutResponseTimer is not configured, and the UEAssistanceInformation message including mu sim-PreferredRRC-state is not transmitted to the gNB1 1h-04 after being configured to perform the switching procedure for leaving RRC_CONNECTED state from the gNB1 1h-04, or if the USIM1 UE 1h-02 needs to leave the RRC_CONNECTED mode due to the multi-USIM operation and the value musim-LeaveWithoutResponseTimer is configured by the timer T3xx is not running.

In step 1h-35, when the condition A is satisfied, the USIM1 UE 1h-02 may initiate the UEAssistanceInformation procedure to transmit a UEAssistanceInformation message including musim-PreferredRRC-state. In addition, if a value musim-LeaveWithoutResponseTimer is configured from the gNB1 1h-04, the USIM1 UE 1h-02 may start a timer T3xx with the value musim-LeaveWithoutResponseTimer. In addition, the USIM1 UE 1h-02 may transmit to the gNB1 1h-04 the UEAssistanceInformation message including musim-PreferredRRC-state.

In step 1h-40, the USIM1 UE 1h-02 in the RRC_CONNECTED mode (e.g., it may be in the RRC_CONNECTED mode since a specific message (e.g., RRCRelease) is not received from the gNB1 1h-04) may be configured to perform the switching procedure for leaving RRC_CONNECTED state from the gNB1 1h-04 and may determine whether the following condition A is satisfied. Due to the modified condition A described above in step 1h-35, the USIM1 UE 1h-02 may not retransmit persistently to the gNB1 1h-04 the UEAssistanceInformation message including musim-PreferredRRC-state.

Figure 1I:
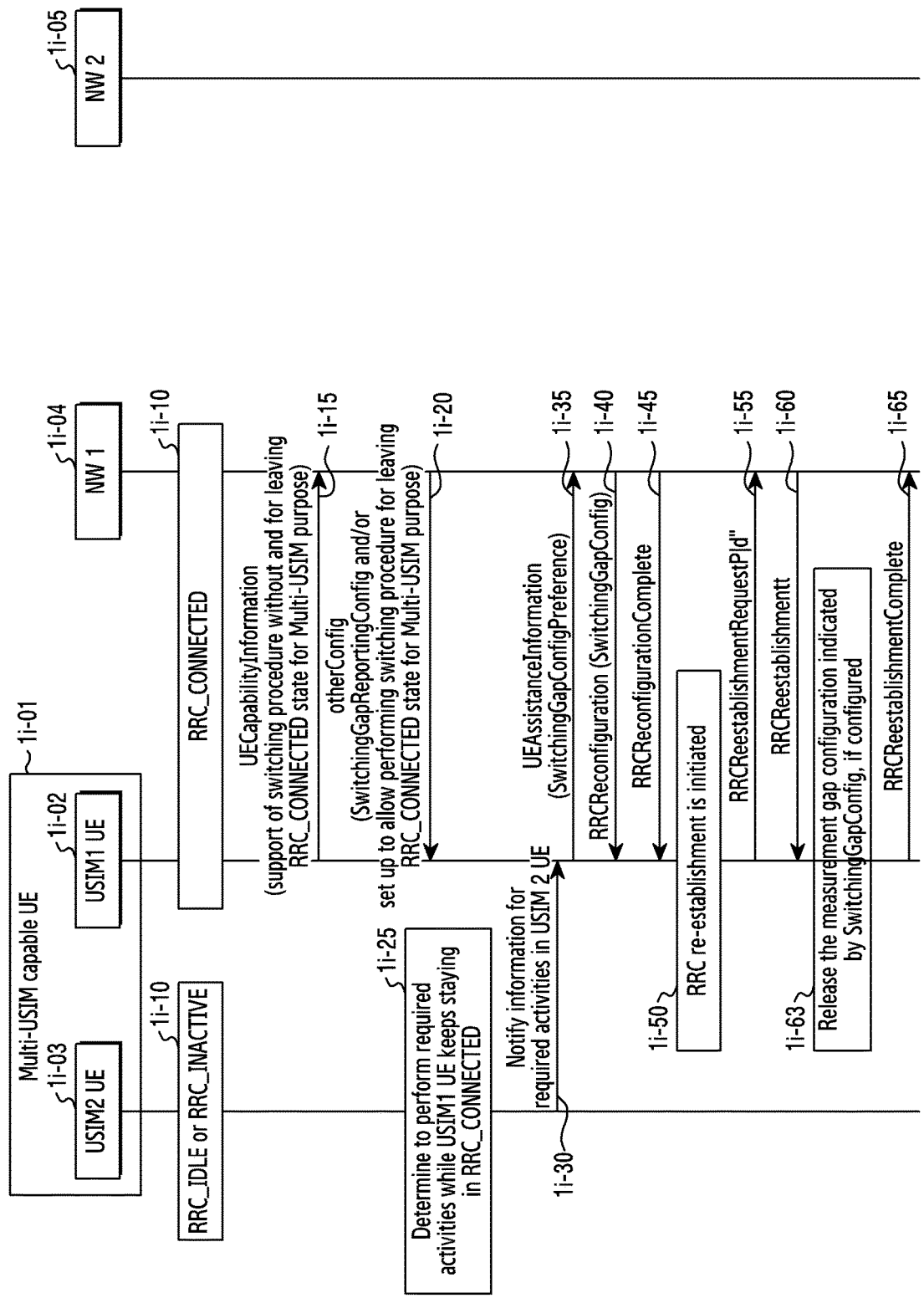
FIG. 1I is a view in which a UE supporting a plurality of USIMs (i.e., a multi-USIM UE) performs an RRC connection re-establishment procedure with a gNB associated with one USIM, according to an embodiment of the disclosure.

FIG. 1I is a view in which a UE supporting a plurality of USIMs (i.e., a multi-USIM UE) performs an RRC connection re-establishment procedure with a gNB associated with one USIM, according to an embodiment of the disclosure.

A multi-USIM UE 1i-01 according to an embodiment of the disclosure may include a UE supporting at least two USIMs. In the disclosure, for convenience of explanation, embodiments will be described based on a dual-USIM UE supporting two USIMs. The dual-USIM UE may transmit data or information only to a gNB associated with one USIM at a specific time. On the other hand, the dual-USIM UE may receive data or information from a gNB associated with one USIM at a specific time or may receive data or information simultaneously from gNBs associated with respective USIMs.

Referring to FIG. 1I, the multi-USIM UE 1*i*-01 may be one UE supporting a plurality of USIMs. For example, the multi-USIM UE may be a USIM1 UE 1*i*-02 when operating in a USIM 1, and may be a USIM2 UE 1*i*-03 when operating in a USIM 2. A gNB associated with each USIM may recognize the multi-USIM UE 1*i*-01 individually for each USIM, instead of recognizing it as one UE. For example, a gNB1 1*i*-04 may recognize the USIM1 UE 1*i*-02 as one UE, and a gNB2 1*i*-05 may recognize the USIM2 UE 1*i*-03 as one UE. Hereinafter, for convenience of explanation, in embodiments of the disclosure, when the multi-USIM UE 1*i*-01 performs communication by using the USIM 1, the multi-USIM UE may be referred to as the USIM1 UE 1*i*-02 or it is referred that the UE uses a first USIM, and when the multi-USIM UE 1*i*-01 performs communication using the USIM 2, the multi-USIM UE 1*i*-01 is referred to as the USIM2 UE 1*i*-03 or it is referred to that the UE uses a first USIM. That is, the multi-USIM UE may be the USIM1 UE 1*i*-02 or the USIM2 UE 1*i*-03 according to which USIM is used between the USIM 1 and the USIM 2.

In step 1*i*-10, the USIM1 UE 1*i*-02 may be in an RRC_CONNECTED mode by establishing an RRC connection with the gNB1 1*i*-04. On the other hand, in step 1*i*-10, the USIM2 UE 1*i*-03 may not establish an RRC connection with the gNB2 1*i*-05 and thus may be in an RRC_IDLE mode or an RRC_INACTIVE mode.

In step 1*i*-15, the USIM1 UE 1*i*-02 may transmit a UE capability information message (UECapabilityInformation) to the gNB1 1*i*-04. The UE capability information message may include at least one piece of following information. Of course, the disclosure is not limited to the following example.

An indicator or information element indicating that the USIM1 UE 1*i*-02 supports a procedure of switching to the USIM2 UE 1*i*-03 while leaving the RRC_CONNECTED mode from the gNB1 1*i*-04 (i.e., a support of switching procedure for leaving RRC_CONNECTED state) may be included. For example, when the USIM2 UE 1*i*-03 establishes or resumes an RRC connection with the gNB2 1*i*-05 and thus transitions to the RRC_CONNECTED mode, the USIM1 UE 1*i*-02 may perform a procedure for reporting to the gNB1 1*i*-04 that it needs to leave the RRC_CONNECTED mode or reporting a preferred RRC state (e.g., an RRC_IDLE mode or an RRC_INACTIVE mode or an RRC_CONNECTED mode) (i.e., a switching procedure for leaving RRC_CONNECTED state).

An indicator or information element indicating that the USIM1 UE 1*i*-02 supports a procedure of switching to the USIM2 UE 1*i*-03 while maintaining the RRC_CONNECTED state with the gNB1 1*i*-04 (e.g., a support of switching procedure without leaving RRC_CONNECTED state) may be included. For example, a procedure in which the USIM2 UE 1*i*-03 performs an operation associated with the gNB2 1*i*-05 while the USIM1 UE 1*i*-02 maintains the RRC_CONNECTED mode with the gNB1 1*i*-04 may be referred to as a switching procedure without leaving RRC_CONNECTED state. An indicator or information element may be included to indicate that the USIM1 UE 1*i*-02 supports a switching gap required to perform communication with the gNB2 1*i*-05 by switching to the USIM2 UE 1*i*-03 while maintaining the RRC_CONNECTED mode with the gNB1 1*i*-04.

The switching gap may include a per-UE level switching gap. If the USIM1 UE 1*i*-02 supports a per-FR or per-frequency switching gap, an additional indicator or information element indicating information on a support for the per-FR or per-frequency gap may be included in the UE capability information message.

In step 1*i*-20, the gNB1 1*i*-04 may configure the USIM1 UE 1*i*-02 to perform the procedure of configuration information (SwitchingGapReportingConfig) to report switching gap information preferred/required for a multi-USIM operation and/or configure the USIM1 UE 1*i*-02 to perform the switching procedure for leaving RRC_CONNECTED state. This may conform to the aforementioned embodiments.

In step 1*i*-30, the USIM2 UE 1*i*-03 may inform the USIM1 UE 1*i*-02 of information required to perform the operation described above in step 1*i*-25 in the RRC_IDLE mode or the RRC_INACTIVE mode. For reference, step 1*i*-30 may be an operation performed inside the multi-USIM UE 1*i*-01. That is, step 1*i*-30 does not require separate communication with the gNB, and is implemented only inside the multi-USIM UE 1*i*-01. This step means data processing performed inside the multi-USIM UE 1*i*-01, and may not be an essential step. This may conform to the aforementioned embodiment.

In step 1*i*-35, the USIM1 UE 1*i*-02 may transmit to the gNB1 1*i*-04 a specific RRC message (e.g., a UEAssistanceInformation message or a new RRC message) containing configuration information (SwitchingGapConfigPreference) for one or a plurality of preferred switching gap patterns. This may conform to the aforementioned embodiment.

In step 1*i*-40, the gNB1 may transmit a specific RRC message (e.g., an RRCReconfiguration or RRCResume or new RRC message) containing one or a plurality of pieces of switching gap configuration information (SwitchingGapConfig or MUSIMGapConfig) based on SwitchingGapConfigPreference requested by the USIM1 UE 1*i*-02 in response to step 1*i*-35. This may conform to the aforementioned embodiment.

In step 1*i*-45, the USIM1 UE 1*i*-02 may transmit a specific RRC message to the gNB1 1*i*-04 in response to the specific RRC message received in step 1*i*-40. For example, the specific RRC message may mean an RRCReconfigurationComplete or RRCResumeComplete or new RRC message or the like. This may conform to the aforementioned embodiment.

In step 1*i*-55, the USIM1 UE 1*i*-02 may initiate the RRC connection re-establishment procedure. When the RRC connection re-establishment procedure is initiated, the USIM1 UE 1*i*-02 may release the configuration information configured in step 1*i*-20 and/or the configuration information configured in step 1*i*-40. In addition, the USIM1 UE 1*i*-02 may select a suitable NR cell through the cell selection process. For reference, the selected suitable NR cell may be a cell different from a PCell connected in advance before the RRC connection establishment procedure is initiated.

In step 1*i*-55, the USIM1 UE 1*i*-02 may transmit an RRCReestablishmentRequest message to the gNB1 1*i*-04.

In step 1*i*-60, the gNB1 1*i*-04 may transmit the RRCReestablishment message to the USIM1 UE 1*i*-02. The disclosure proposes that the USIM1 UE 1*i*-02 releases SwitchingGapConfig configured in step 1*i*-40 (step 1*i*-63) if the USIM1 UE 1*i*-02 receives the RRCReestablishment message from the gNB1 1*i*-04. Since the NR cell selected in step 1*i*-50 may be a cell different from the PCell connected before the RRC connection re-establishment procedure is initiated, this is to autonomously release the pre-setup SwitchingGapConfig so as not to perform the multi-USIM operation (i.e., an operation for the USIM2 UE) because the pre-setup Switching-GapConfig may not be valid for the USIM1 UE 1*i*-02. This is because, if the USIM1 UE 1*i*-02 does not autonomously release the pre-setup SwitchingGapConfig but continuously maintain and apply it, when another gNB1 1*i*-04 provides a service to the USIM1 UE 1*i*-02 at a later time, the USIM1 UE 1*i*-02 may switch to the USIM2 UE 1*i*-04, which may result in waste of resources of the gNB1 1*i*-04.

In step 1*i*-65, the USIM1 UE 1*i*-02 may successfully perform the RRC connection re-establishment procedure by transmitting the RRCReestablishmentComplete message to the gNB1 1*i*-04.

Figure 1J:
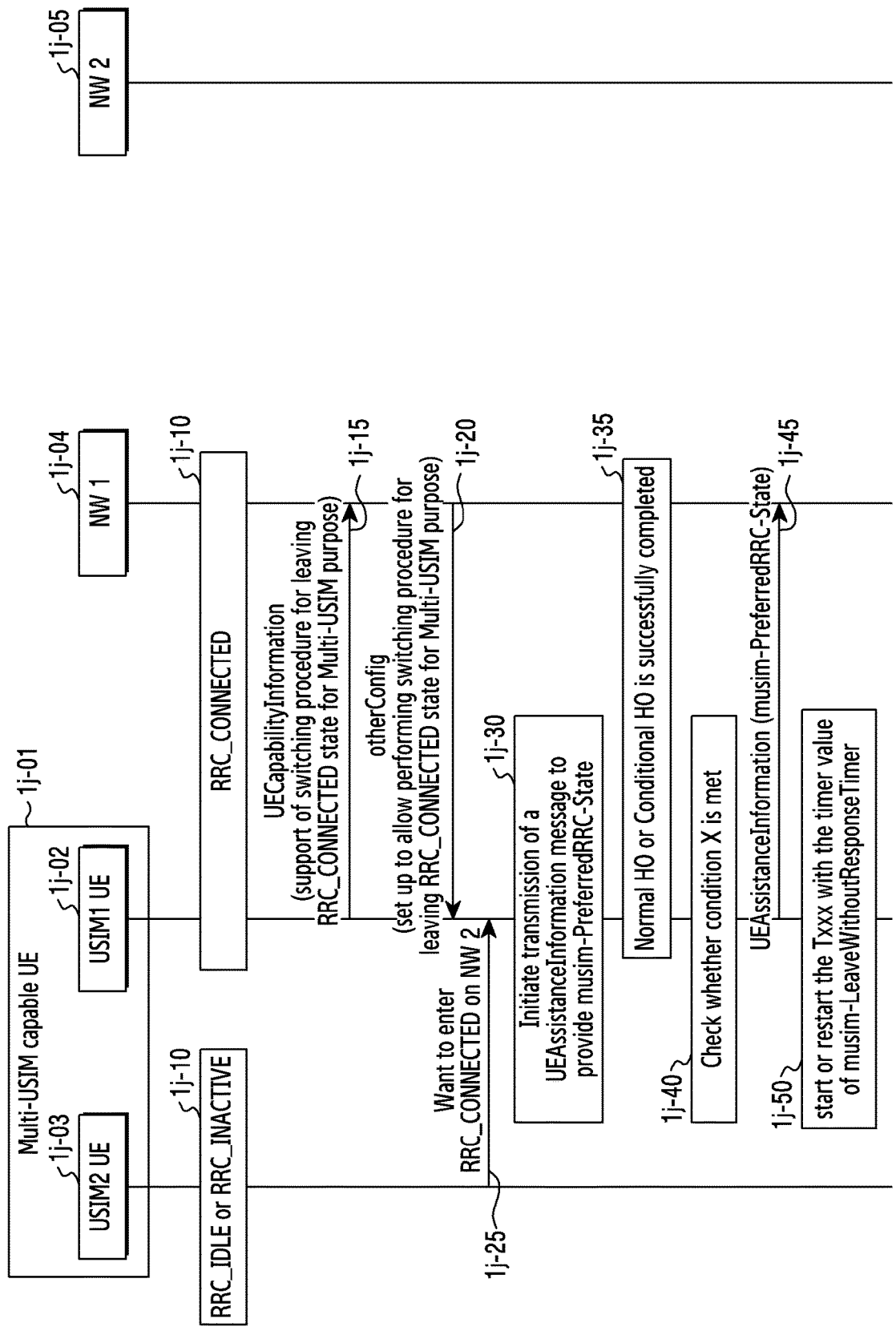
FIG. 1J is a view in which a UE supporting a plurality of USIMs (i.e., a multi-USIM UE) performs an operation of transmitting a UEAssistanceInformation message after performing a handover or a conditional handover from a gNB associated with one USIM, according to an embodiment of the disclosure.

FIG. 1J is a view in which a UE supporting a plurality of USIMs (i.e., a multi-USIM UE) performs an operation of transmitting a UEAssistanceInformation message after performing a handover or a conditional handover from a gNB associated with one USIM, according to an embodiment of the disclosure.

A multi-USIM UE 1*j*-01 according to an embodiment of the disclosure may include a UE supporting at least two USIMs. In the disclosure, for convenience of explanation, embodiments will be described based on a dual-USIM UE supporting two USIMs. The dual-USIM UE may transmit data or information only to a gNB associated with one USIM at a specific time. On the other hand, the dual-USIM UE may receive data or information from a gNB associated with one USIM at a specific time or may receive data or information simultaneously from gNBs associated with respective USIMs.

Referring to FIG. 1J, the multi-USIM UE 1*j*-01 may be one UE supporting a plurality of USIMs. For example, the multi-USIM UE may be a USIM1 UE 1*j*-02 when operating in a USIM 1, and may be a USIM2 UE 1*j*-03 when operating in a USIM 2. A gNB associated with each USIM may recognize the multi-USIM UE 1*j*-01 individually for each USIM, instead of recognizing it as one UE. For example, a gNB1 1*j*-04 may recognize the USIM1 UE 1*j*-02 as one UE, and a gNB2 1*j*-05 may recognize the USIM2 UE 1*j*-03 as one UE. Hereinafter, for convenience of explanation, in embodiments of the disclosure, when the multi-USIM UE 1*j*-01 performs communication by using the USIM 1, the multi-USIM UE 1*j*-01 may be referred to as the USIM1 UE 1*j*-02 or it is referred that the UE uses a first USIM, and when the multi-USIM UE performs communication using the USIM 2, the multi-USIM UE 1*j*-01 is referred to as the USIM2 UE 1*j*-03 or it is referred to that the UE uses a second USIM. That is, the multi-USIM UE 1*j*-01 may be the USIM1 UE 1*j*-02 or the USIM2 UE 1*j*-03 according to which USIM is used between the USIM 1 and the USIM 2.

In step 1*j*-10, the USIM1 UE 1*j*-02 may be in an RRC_CONNECTED mode by establishing an RRC connection with the gNB1 1*j*-04. On the other hand, in step 1*j*-10, the USIM2 UE 1*j*-03 may not establish an RRC connection with the gNB2 1*j*-05 and thus may be in an RRC_IDLE mode or an RRC_INACTIVE mode.

In step 1*j*-15, the USIM1 UE 1*j*-02 may transmit a UE capability information message (UECapabilityInformation) to the gNB1 1*j*-04. The UE capability information message may include at least one piece of following information.

An indicator or information element indicating that the USIM1 UE 1*j*-02 supports a procedure of switching to the USIM2 UE 1*j*-03 while leaving the RRC_CONNECTED mode from the gNB1 1*j*-04 (i.e., a support of switching procedure for leaving RRC_CONNECTED state) may be included. For example, when the USIM2 UE 1*j*-03 establishes or resumes an RRC connection with the gNB2 1*j*-05 and thus transitions to the RRC_CONNECTED mode, the USIM1 UE 1*j*-02 may perform a procedure for reporting to the gNB1 1*j*-04 that it needs to leave the RRC_CONNECTED mode or reporting a preferred RRC state (e.g., an RRC_IDLE mode or an RRC_INACTIVE mode or an RRC_CONNECTED mode) (i.e., a switching procedure for leaving RRC_CONNECTED state).

An indicator or information element indicating that the USIM1 UE 1*j*-02 supports a procedure of switching to the USIM2 UE 1*j*-03 while maintaining the RRC_CONNECTED state with the gNB1 1*j*-04 (e.g., a support of switching procedure without leaving RRC_CONNECTED state) may be included. For example, a procedure in which the USIM2 UE 1*j*-03 performs an operation associated with the gNB2 1*j*-05 while the USIM1 UE 1*j*-02 maintains the RRC_CONNECTED mode with the gNB1 1*j*-04 may be referred to as a switching procedure without leaving RRC_CONNECTED state. An indicator or information element may be included to indicate that the USIM1 UE 1*j*-02 supports a switching gap required to perform communication with the gNB2 1*j*-05 by switching to the USIM2 UE 1*j*-03 while maintaining the RRC_CONNECTED mode with the gNB1 1*j*-04.

The switching gap may include a per-UE level switching gap. If the USIM1 UE 1*j*-02 supports a per-FR or per-frequency switching gap, an additional indicator or information element indicating information on a support for the per-FR or per-frequency gap may be included in the UE capability information message.

In step 1*j*-20, the gNB1 1*j*-04 may configure the USIM1 UE 1*j*-02 to perform the switching procedure without leaving RRC_CONNECTED state. This may conform to the aforementioned embodiments.

In step 1*j*-25, the USIM2 UE 1*j*-03 may report this to the USIM1 UE 1*j*-02 in order to establish or resume an RRC connection with the gNB2 1*j*-05.

In step 1*j*-30, the USIM1 UE 1*j*-02 configured to perform the switching procedure for leaving RRC_CONNECTED state from the gNB1 1*j*-04 in step 1*j*-20 may initiate the UEAssistanceInformation procedure to transmit the message including musim-PreferredRRC-state. This may conform to the aforementioned embodiment.

In step 1*j*-35, the USIM1 UE 1*j*-02 may successfully perform a handover or a conditional handover with respect to the gNB1 1*j*-04. For example, the handover or the conditional handover may mean a case where a random access procedure is successfully performed with a target cell for performing the handover or the conditional handover.

In step 1*j*-40, the USIM1 UE 1*j*-02 may determine whether the following condition X is satisfied.

Condition X: The USIM1 UE 1*j*-02 determines the following content sequentially or non-sequentially.

1> If reconfigurationWithSync in configuration information for performing the handover or the conditional handover in step 1*j*-35 is included in masterCellGroup or secondaryCellGroup 2> If the USIM1 UE 1*j*-02 has initiated transmission of the UEAssistanceInformation message to a corresponding cell group (e.g., a source cell group before the handover or the conditional handover is performed) during a past one second and is configured to still provide a corresponding cell group (e.g., a target cell group after the handover or the conditional handover is successfully performed) with UE assistance information concerned by the UE or the RRCReconfiguration message is applied due to a conditional re-configuration condition and the UE is configured to transmit the UEAssistanceInformation message to a corresponding cell group in accordance with the section 5.7.4.2 of the standard 38.331 and then is configured to transmit the UEAssistanceInformation message to the corresponding cell group to initiate transmission of the UEAsssitanceInformation message.

In step 1*j*-45, when the condition X is satisfied, the USIM1 UE 1*j*-02 may initiate transmission of the UEAssistanceInformation message to provide the concerned UE assistance information to the corresponding cell group in accordance with the section 5.7.4.3 of the standard 38.331. For example, the concerned UE assistance information may mean musim-PreferredRRC-State.

In step 1*j*-50, if the value musim-LeaveWithoutResponseTimer is configured, the UE may start or re-start the timer T3xx with the value.

Figure 1K:
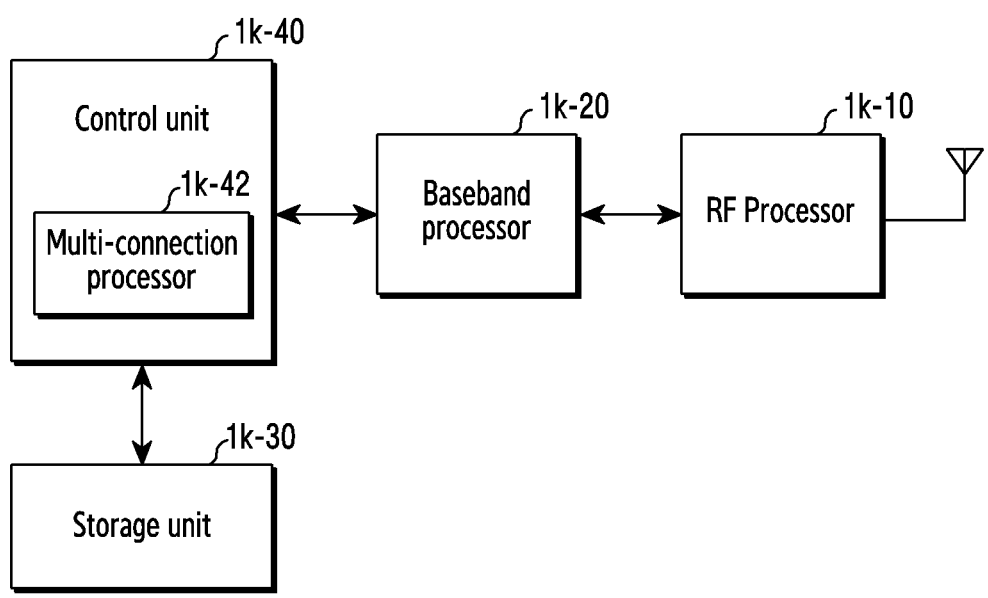
FIG. 1K is a block diagram illustrating a structure of a UE according to an embodiment of the disclosure.

FIG. 1K is a block diagram illustrating a structure of a UE according to an embodiment of the disclosure.

Referring to the figure, the UE may include an RF processor 1*k*-10, a baseband processor 1*k*-20, a storage unit 1*k*-30, and a control unit 1*k*-40. Of course, the disclosure is not limited thereto, and the UE may include less components or more components than the components of FIG. 1K.

The RF processor 1*k*-10 may perform a function for transmitting and receiving a signal via a radio channel, such as signal band conversion, amplification, or the like. That is, the RF processor 1*k*-10 may up-convert a baseband signal into a Radio Frequency (RF) signal provided from the baseband processor 1*k*-20 and then transmit it through an antenna, and may down-convert an RF signal received through the antenna into a baseband signal. For example, the RF processor 1*k*-10 may include a transmission filter, a reception filter, an amplifier, a mixer, an oscillator, a Digital to Analog Convertor (DAC), an Analog to Digital Convertor (ADC), or the like. Although only one antenna is illustrated in FIG. 1K, a UE may have a plurality of antennas. In addition, the RF processor 1*k*-10 may include a plurality of RF chains. Further, the RF processor 1*k*-10 may perform beamforming. For the beamforming, the RF processor 1*k*-10 may adjust a phase and magnitude of each of signals transmitted and received through a plurality of antennas or antenna elements. In addition, the RF processor 1*k*-10 may perform a Multi Input Multi Output (MIMO) operation, and may receive several layers when performing the MIMO operation.

The baseband processor 1*k*-20 may perform a conversion function between a baseband signal and a bit-stream according to a physical layer protocol of the system. For example, in data transmission, the baseband processor 1*k*-20 may generate complex symbols by coding and modulating a transmission bit-stream. In addition, in data reception, the baseband processor 1*k*-20 may restore a reception bit-stream by demodulating and decoding a baseband signal provided from the RF processor 1*k*-10. For example, in case of conforming to an Orthogonal Frequency Division Multiplexing (OFDM) scheme, in data transmission, the baseband processor 1*k*-20 may generate complex symbols by performing coding and modulation on a transmitted bit-stream, map the complex symbols to subcarriers, and then configure OFDM symbols by performing an Inverse Fast Fourier Transform (IFFT) operation and a Cyclic Prefix (CP) insertion operation. In addition, in data reception, the baseband processor 1*k*-20 may split the baseband signal provided from the RF processor 1*k*-10 on an OFDM symbol basis, restore signals mapped to the subcarriers by using a Fast Fourier Transform (FFT) operation, and then restore a received bit-stream by performing demodulation and decoding.

The baseband processor 1*k*-20 and the RF processor 1*k*-10 transmit and receive a signal as described above. Accordingly, the baseband processor 1*k*-20 and the RF processor 1*k*-10 may be referred to as a transmitter, a receiver, a transceiver, or a communication unit. Further, at least one of the baseband processor 1*k*-20 and the RF processor 1*k*-10 may include a plurality of communication modules to support a plurality of different radio access technologies. In addition, at least one of the baseband processor 1*k*-20 and the RF processor 1*k*-10 may include different communication modules to process signals of different frequency bands. For example, the different radio access technologies may include a wireless LAN (e.g., IEEE 802.11), a cellular network (e.g., LTE), etc. In addition, the different frequency bands may include a Super High Frequency (SHF) (e.g., 2.NRHz, NRhz) band and a millimeter (mm) wave (e.g., 60 GHz) band. The UE may transmit and receive a signal with respect to the gNB by using the baseband processor 1*k*-20 and the RF processor 1*k*-10, and the signal may include control information and data.

The storage unit 1*k*-30 may store data such as a basic program, an application program, setup information, or the like for an operation of the UE. In particular, the storage unit 1*k*-30 may store information related to a second access node which performs wireless communication by using a second radio access technology. In addition, the storage unit 1*k*-30 may provide stored data at the request of the control unit 1*k*-40. The storage unit 1*k*-30 may be constructed of storage media such a Read Only Memory (ROM), a Random Access Memory (RAM), a hard disk, a Compact Disc-ROM (CD-ROM), a Digital Versatile Disc (DVD), or the like, or combinations of the storage media. In addition, the storage unit 1*k*-30 may be constructed of a plurality of memories. According to an embodiment, the storage unit 1*k*-30 may store a program for performing a method in which a UE supporting the plurality of USIMs transmits UE assistance information.

The control unit 1*k*-40 controls overall operations of the UE. For example, the control unit 1*k*-40 transmits and receives a signal via the baseband processor 1*k*-20 and the RF processor 1*k*-10. In addition, the control unit 1*k*-40 may write data to the storage unit 1*k*-30 and read the data. For this, the control unit 1*k*-40 may include at least one processor. For example, the control unit 1*k*-40 may include a Communication Processor (CP) which provides control for communication and an Application Processor (AP) which provides control to a higher layer such as an application program. In addition, at least one component in the UE may be implemented as a single chip. In addition, according to an embodiment of the disclosure, the control unit 1*k*-40 may include a multi-connection processor 1*k*-42 which performs processing to operate in a multi-connection mode.

According to an embodiment of the disclosure, the control unit 1*k*-40 may control each component of a UE supporting a plurality of USIMs described above so that the UE performs a method of transmitting UE assistance information. That is, each component of the UE may operate to perform the aforementioned embodiments of the disclosure.

Figure 1L:
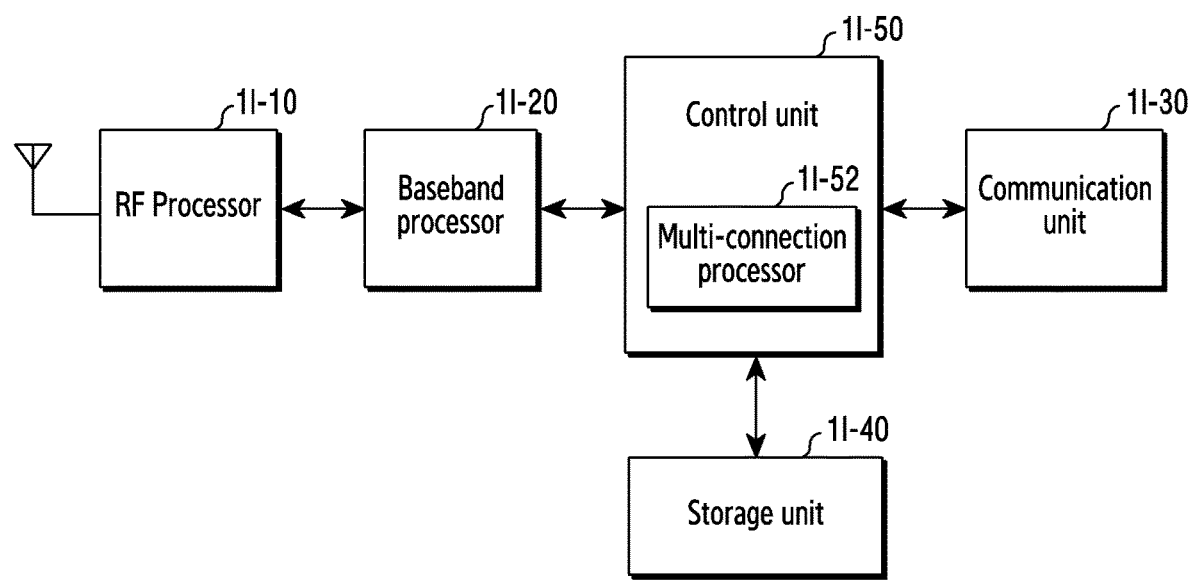
FIG. 1L is a block diagram illustrating a structure of a New Radio (NR) gNB according to an embodiment of the disclosure.

FIG. 1L is a block diagram illustrating a structure of an NR gNB according to an embodiment of the disclosure.

Referring to FIG. 1L, the gNB may include an RF processor 1*l*-10, a baseband processor 1*l*-20, a backhaul communication unit 1*l*-30, a storage unit 1*l*-40, and a control unit 1*l*-50. Of course, the disclosure is not limited thereto, and the gNB may include less components or more components than the components of FIG. 1L.

The RF processor 1*l*-10 may perform a function for transmitting and receiving a signal via a radio channel, such as signal band conversion, amplification, or the like. That is, the RF processor 1*l*-10 may up-convert a baseband signal into a Radio Frequency (RF) signal provided from the baseband processor 1*l*-20 and then transmit it through an antenna, and may down-convert an RF signal received through the antenna into a baseband signal. For example, the RF processor 1*l*-10 may include a transmission filter, a reception filter, an amplifier, a mixer, an oscillator, a DAC, an ADC, or the like. Although only one antenna is illustrated in FIG. 1L, a UE may have a plurality of antennas. In addition, the RF processor 1*l*-10 may include a plurality of RF chains. Further, the RF processor 1*l*-10 may perform beamforming. For the beamforming, the RF processor 1*l*-10 may adjust a phase and magnitude of each of signals transmitted and received through a plurality of antennas or antenna elements. The RF processor may perform a downlink MIMO operation by transmitting at least one layer.

The baseband processor 1*l*-20 may perform a conversion function between a baseband signal and a bit-stream according to a physical layer protocol of a specific access technology. For example, in data transmission, the baseband processor 1*l*-20 may generate complex symbols by coding and modulating a transmission bit-stream. In addition, in data reception, the baseband processor 1*l*-20 may restore a reception bit-stream by demodulating and decoding a baseband signal provided from the RF processor 1*l*-10. For example, in case of conforming to an OFDM scheme, in data transmission, the baseband processor 1*l*-20 may generate complex symbols by performing coding and modulation on a transmitted bit-stream, map the complex symbols to subcarriers, and then configure OFDM symbols by performing an IFFT operation and a CP insertion operation. In addition, in data reception, the baseband processor 1*l*-20 splits the baseband signal provided from the RF processor 1*l*-10 on an OFDM symbol basis, restores signals mapped to the subcarriers by using an FFT operation, and then restores a received bit-stream by performing demodulation and decoding. The baseband processor 1*l*-20 and the RF processor 1*l*-10 transmit and receive a signal as described above. Accordingly, the baseband processor 1*l*-20 and the RF processor 1*l*-10 may be referred to as a transmitter, a receiver, a transceiver, or a communication unit. The gNB may transmit and receive a signal with respect to the UE by using the baseband processor 1*l*-20 and the RF processor 1*l*-10, and the signal may include control information and data.

The communication unit 1*l*-30 may provide an interface for performing communication with other nodes in the network. That is, the communication unit 1*l*-30 may convert a bitstream transmitted from a main gNB to another node, i.e., an auxiliary gNBs, a core network, or the like, into a physical signal, and may convert the physical signal received from another node into a bitstream. The communication unit 1*l*-30 may be a backhaul communication unit.

The storage unit 1*l*-40 may store data such as a basic program, an application program, setup information, or the like for an operation of the main gNB. In particular, the storage unit 1*l*-40 may store information on a bearer assigned to an accessed UE, a measurement result reported from the accessed UE, or the like. In addition, the storage unit 1*l*-40 may store information used as a criterion for determining whether to provide or stop multiple connections to the UE. In addition, the storage unit 1*l*-40 may provide the stored data at the request of the control unit 1*l*-50. The storage unit 1*l*-40 may be constructed of a storage medium such as a ROM, a RAM, a hard disk, a CD-ROM, and a DVD, or a combination of storage media. In addition, the storage unit 1*l*-40 may be constructed of a plurality of memories. According to an embodiment, the storage unit 1*l*-40 may store a program for performing a method in which a UE supporting a plurality of USIMs described above transmits UE assistance information.

The control unit 1*l*-50 controls overall operations of the gNB. For example, the control unit 1*l*-50 transmits and receives a signal via the baseband processor 1*l*-20 and the RF processor 1*l*-10 or via the communication unit 1*l*-30. In addition, the control unit 1*l*-50 may write data to the storage unit 1*l*-40 and read the data. For this, the control unit 1*l*-50 may include at least one processor. In addition, at least one component in the gNB may be implemented as a single chip. In addition, each component of the gNB may operate to perform the aforementioned embodiments of the disclosure.

Figure 1M:
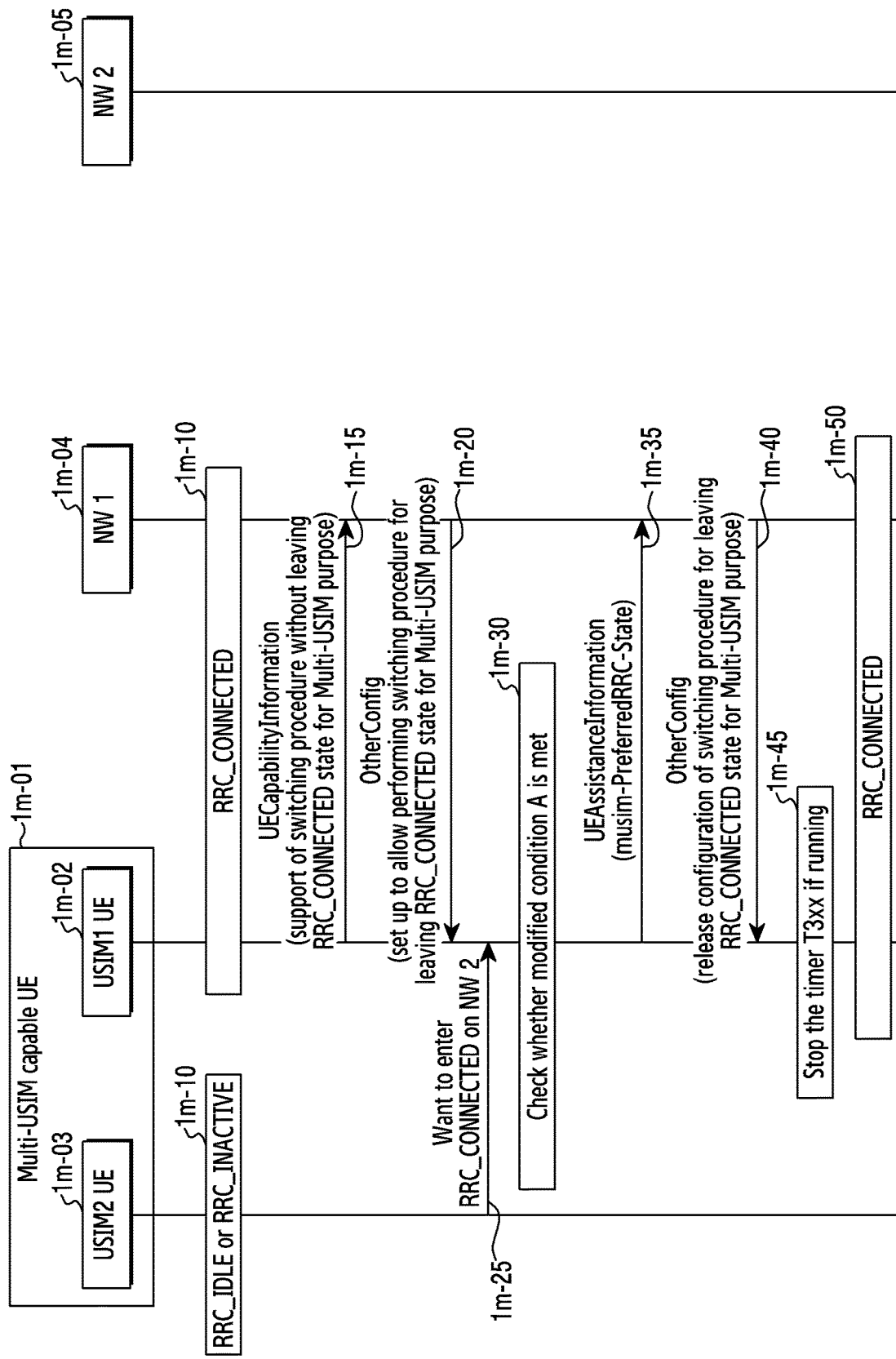
FIG. 1M is a view in which a UE supporting a plurality of USIMs (i.e., a multi-USIM UE) performs an operation associated with another USIM by releasing an RRC_CONNECTED mode with a gNB associated with one USIM, according to an embodiment of the disclosure.

FIG. 1M is a view in which a UE supporting a plurality of USIMs (i.e., a multi-USIM UE) performs an operation associated with another USIM by releasing an RRC_CONNECTED mode with a gNB associated with one USIM, according to an embodiment of the disclosure.

A multi-USIM UE 1*m*-01 according to an embodiment of the disclosure may include a UE supporting at least two USIMs. In the disclosure, for convenience of explanation, embodiments will be described based on a dual-USIM UE supporting two USIMs. The dual-USIM UE may transmit data or information only to a gNB associated with one USIM at a specific time. On the other hand, the dual-USIM UE may receive data or information from a gNB associated with one USIM at a specific time or may receive data or information simultaneously from gNBs associated with respective USIMs.

Referring to FIG. 1M, the multi-USIM UE 1*m*-01 may be one UE supporting a plurality of USIMs. For example, the multi-USIM UE may be a USIM1 UE 1*m*-02 when operating in a USIM 1, and may be a USIM2 UE 1*m*-03 when operating in a USIM 2. A gNB associated with each USIM may recognize the multi-USIM UE 1*m*-01 individually for each USIM, instead of recognizing it as one UE. For example, a gNB1 1*m*-04 may recognize the USIM1 UE 1*m*-02 as one UE, and a gNB2 1*m*-05 may recognize the USIM2 UE 1*m*-03 as one UE. Hereinafter, for convenience of explanation, in embodiments of the disclosure, when the multi-USIM UE 1*m*-01 performs communication by using the USIM 1, the multi-USIM UE 1*m*-01 may be referred to as the USIM1 UE 1*m*-02 or it is referred that the UE uses a first USIM, and when the multi-USIM UE 1*m*-01 performs communication using the USIM 2, the multi-USIM UE is referred to as the USIM2 UE 1*m*-03 or it is referred to that the UE uses a second USIM. That is, the multi-USIM UE may be the USIM1 UE 1*m*-02 or the USIM2 UE 1*m*-03 according to which USIM is used between the USIM 1 and the USIM 2.

In step 1*m*-10, the USIM1 UE 1*m*-02 may be in an RRC_CONNECTED mode by establishing an RRC connection with the gNB1 1*m*-04. On the other hand, in step 1*m*-10, the USIM2 UE 1*m*-03 may not establish an RRC connection with the gNB2 1*m*-05 and may be in an RRC_IDLE mode or an RRC_INACTIVE mode.

In step 1*m*-15, the USIM1 UE 1*m*-02 may transmit a UE capability information message (UECapabilityInformation) to the gNB1 1*m*-04. The UE capability information message may include at least one piece of following information. Of course, the disclosure is not limited to the following example.

An indicator or information element indicating that the USIM1 UE 1*m*-02 supports a procedure of switching to the USIM2 UE 1*m*-03 while leaving the RRC_CONNECTED mode from the gNB1 1*m*-04 (i.e., a support of switching procedure for leaving RRC_CONNECTED state) may be included. For example, when the USIM2 UE 1*m*-03 establishes or resumes an RRC connection with the gNB2 1*m*-05 and thus transitions to the RRC_CONNECTED mode, the USIM1 UE 1*m*-02 may perform a procedure for reporting to the gNB1 1*m*-04 that it needs to leave the RRC_CONNECTED mode or reporting a preferred RRC state (e.g., an RRC_IDLE mode or an RRC_INACTIVE mode or an RRC_CONNECTED mode) (i.e., a switching procedure for leaving RRC_CONNECTED state).

In step 1*m*-20, the gNB1 1*m*-04 may configure the USIM1 UE 1*m*-02 to perform a switching procedure for leaving RRC_CONNECTED state. For example, through the RRCReconfiguration message containing other Config, the gNB1 1*m*-04 may configure the USIM1 UE 1*m*-02 to perform the switching procedure for leaving RRC_CONNECTED state.

Therefore, the USIM1 UE 1*m*-02 may determine that it is possible to perform the switching procedure for leaving RRC_CONNECTED state. If the USIM1 UE 1*m*-02 is configured to perform the switching procedure for leaving RRC_CONNECTED state, the gNB1 1*m*-04 may transmit the USIM1 UE 1*m*-02 an RRCReconfiguration message including the new timer value musim-LeaveWithoutResponseTimer. The value musim-LeaveWithoutResponseTimer is used to allow the USIM1 UE 1*m*-02 to transition to the RRC_IDLE state autonomously without a response of the gNB, and a specific UE operation may be as follows.

If the USIM1 UE 1*m*-02 is configured to perform a switching procedure for leaving RRC_CONNECTED state from the gNB1 1*m*-04 and thus needs to leave the RRC_CONNECTED state, the USIM1 UE 1*m*-02 may initiate a UEAssistanceInformation procedure to transmit to the gNB1 1*m*-04 a UEAssistanceInformation message including a musim-PreferredRRC-state. For this, if the USIM1 UE 1*m*-02 initiates the UEAssistanceInformation procedure, the USIM1 UE 1*m*-02 may use a value musim-LeaveWithoutResponseTimer configured from the gNB1 1*m*-04 to start a timer T3xx. The USIM1 UE 1*m*-02 may stop the running timer T3xx if a specific RRC message (e.g., RRCRelease) is received from the gNB1 1*m*-04. Alternatively, the USIM1 UE 1*m*-02 may stop the running timer T3xx if a release configuration is received from the gNB1 1*m*-04 through the RRCReconfiguration message containing other-Config so that the switching procedure for leaving RRC_CONNECTED state is not performed at a later time. Alternatively, the USIM1 UE 1*m*-02 may be configured at a later time with the value musim-LeaveWithoutResponseTime from the gNB1 1*m*-04 through the RRCReconfiguration message containing otherConfig or may stop the running timer T3xx if the value musim-LeaveWithoutResponseTimer is not configured. Of course, if the value musim-LeaveWithoutResponseTimer is configured at a later time from the gNB1 1*m*-04 through the RRCReconfiguration message containing otherConfig, the USIM1 UE 1*m*-02 may re-start the timer T3xx with the newly configured value musim-LeaveWithoutResponseTimer. The USIM1 UE 1*m*-02 may automatically transition to the RRC_IDLE state if the specific RRC message is not received from the gNB1 1*m*-04 and thus the running timer T3xx expires.

In step 1*m*-25, the USIM2 UE 1*m*-03 may report this to the USIM1 UE 1*m*-02 in order to establish or resume an RRC connection with the gNB2 1*m*-05.

In step 1*m*-30, the USIM1 UE 1*m*-02 configured to perform the switching procedure for leaving RRC_CONNECTED state from the gNB1 1*m*-04 may determine whether the following modified condition A is satisfied.

Modified condition A: This is a case where the USIM1 UE 1*m*-02 needs to leave the RRC_CONNECTED mode due to the multi-USIM operation, and does not transmit to the gNB1 1*m*-04 the UEAssistanceInformation message including musim-PreferredRRC-state after being configured to perform the switching procedure for leaving RRC_CONNECTED state.

Alternatively, the modified condition A may mean at least one of the followings.

If the USIM1 UE 1*m*-02 needs to leave the RRC_CONNECTED mode due to the multi-USIM operation and the timer T3xx is not running or if the USIM1 UE 1*m*-02 needs to leave the RRC_CONNECTED mode due to the multi-USIM operation and the value musim-LeaveWithoutResponseTimer is configured but the timer Tx33 is not running If the USIM1 UE 1*m*-02 needs to leave the RRC_CONNECTED mode due to the multi-USIM operation, the value musim-LeaveWithoutResponseTimer is not configured, and the UEAssistanceInformation message including musim-PreferredRRC-state is not transmitted to the gNB1 1*m*-04 after being configured to perform the switching procedure for leaving RRC_CONNECTED state from the gNB1 1*m*-04, or if the USIM1 UE 1*m*-02 needs to leave the RRC_CONNECTED mode due to the multi-USIM operation and the value musim-LeaveWithoutResponseTimer is configured but the timer T3xx is not running.

In step 1*m*-35, if the modified condition A is satisfied, the USIM1 UE 1*m*-02 may initiate the UEAssistanceInformation procedure to transmit the UEAssistanceInformation message including musim-PreferredRRC-state. In addition, if the value musim-LeaveWithoutResponseTimer is configured from the gNB1 1*m*-04, the USIM1 UE 1*m*-02 may start the timer T3xx with the value musim-LeaveWithoutResponseTimer. In addition, the USIM1 UE 1*m*-02 may transmit to the gNB1 1*m*-04 the UEAssistanceInformation including musim-PreferredRRC-state.

In step 1*m*-40, the gNB1 1*m*-04 may release the related configuration information or may not configure the value musim-LeaveWithoutResponseTimer so that the USIM1 UE 1*m*-02 does not perform the switching procedure for leaving RRC_CONNECTED state. For example, the gNB1 1*m*-04 may configure the USIM1 UE 1*m*-02 not to perform the switching procedure for leaving RRC_CONNECTED state through the RRCReconfiguration message containing otherConfig. Specifically, the gNB1 1*m*-04 may release the related configuration information or may not configure the value musim-LeaveWithoutResponseTimer so that the USIM1 UE 1*m*-02 does not perform the switching procedure for leaving RRC_CONNECTED state.

Method 1: The gNB1 1*m*-04 releases configuration information (e.g., musim-AssistanceConfigforLeaving) for the switching procedure for leaving RRC_CONNECTED state to the USIM1 UE 1*m*-02.

In this case, the USIM1 UE 1*m*-02 determines that the gNB1 1*m*-04 does not perform the switching procedure for leaving RRC_CONNECTED state. In addition, if the timer T3xx is running, the USIM1 UE 1*m*-02 may stop the running timer T3xx (step 1*m*-45). The USIM1 UE 1*m*-02 may maintain the RRC_CONNECTED mode with the gNB1 1*m*-04 (step 1*m*-50).

Method 2: The gNB1 1*m*-04 uses a new indicator to indicate to the USIM1 UE 1*m*-02 that it is not possible to perform the switching procedure for leaving RRC_CONNECTED state.

In this case, the USIM1 UE 1*m*-02 determines that the gNB1 1*m*-04 does not perform the switching procedure for leaving RRC_CONNECTED state. In addition, if the timer T3xx is running, the USIM1 UE 1*m*-02 may stop the running timer T3xx (step 1*m*-45). The USIM1 UE 1*m*-02 may maintain the RRC_CONNECTED mode with the gNB1 1*m*-04 (step 1*m*-50).

Method 3: The gNB1 1*m*-04 does not configure the value musim-LeaveWithoutResponseTimer to the USIM1 UE 1*m*-02.

If the timer T3xx is running, the USIM1 UE 1*m*-02 may stop the running timer T3xx (step 1*m*-45). The USIM1 UE 1*m*-02 may maintain the RRC_CONNECTED mode with the gNB1 1*m*-04 (step 1*m*-50).

Method 4: The gNB1 1*m*-04 releases every configuration information (e.g., musim-AssistanceConfig) for the switching procedure for leaving RRC_CONNECTED state and the switching procedure without leaving RRC_CONNECTED state to the USIM1 UE 1*m*-02.

In this case, the USIM1 UE 1*m*-02 determines that the gNB1 1*m*-04 does not perform the switching procedure for leaving RRC_CONNECTED state and the switching procedure without leaving RRC_CONNECTED state. In addition, if the timer T3xx is running, the USIM1 UE 1*m*-02 may stop the running timer T3xx (step 1*m*-45). Of course, it is also possible to stop a prohibit timer for the switching procedure without leaving RRC_CONNECTED state if the prohibit timer is running. The USIM1 UE 1*m*-02 may maintain the RRC_CONNECTED mode with the gNB1 1*m*-04 (step 1*m*-50).

In step 1*m*-40, the gNB1 1*m*-04 may re-configure the value musim-LeaveWithoutResponseTimer to the USIM1 UE 1*m*-02. In this case, if the timer T3xx is running, the USIM1 UE 1*m*-02 may stop the running timer T3xx (step 1*m*-45) or may re-start the timer T3xx with the re-configured value musim-LeaveWithoutResponseTimer. The USIM1 UE 1*m*-02 may maintain the RRC_CONNECTED mode with the gNB1 1,-04 (step 1*m*-50).

Methods based on the embodiments disclosed in the claims and/or specification of the disclosure may be implemented in hardware, software, or a combination of both.

When implemented in software, computer readable recording medium for storing one or more programs (i.e., software modules) may be provided. The one or more programs stored in the computer readable recording medium are configured for execution performed by one or more processors in the electronic device. The one or more programs include instructions for allowing the electronic device to execute the methods based on the embodiments disclosed in the claims and/or specification of the disclosure.

The program (i.e., the software module or software) may be stored in a random access memory, a non-volatile memory including a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs) or other forms of optical storage devices, and a magnetic cassette. Alternatively, the program may be stored in a memory configured in combination of all or some of these storage media. In addition, the configured memory may be plural in number.

Further, the program may be stored in an attachable storage device capable of accessing the electronic device through a communication network such as the Internet, an Intranet, a Local Area Network (LAN), a Wide LAN (WLAN), or a Storage Area Network (SAN) or a communication network configured by combining the networks. The storage device may have access to a device for performing an embodiment of the disclosure via an external port. In addition, an additional storage device on a communication network may have access to the device for performing the embodiment of the disclosure.

In the aforementioned specific embodiments of the disclosure, a component included in the disclosure is expressed in a singular or plural form according to the specific embodiment proposed herein. However, the singular or plural expression is selected properly for a situation proposed for the convenience of explanation, and thus the various embodiments of the disclosure are not limited to a single or a plurality of components. Therefore, a component expressed in a plural form may also be expressed in a singular form, or vice versa.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a user equipment (UE) supporting multi-universal subscriber identity module (MUSIM), in a wireless communication system, the method comprising:
   receiving, from a base station, configuration information on a MUSIM operation;
   transmitting, to the base station, a UE assistance information message, in case that the UE needs to leave from a radio resource control (RRC) connected state and a timer for transitioning state is not running; and
   starting the timer for transitioning state based on the configuration information on the MUSIM operation,
   wherein the configuration information on the MUSIM operation includes a parameter regarding the timer for transitioning state and a parameter regarding a timer for prohibiting sending preferred switching gap configuration information.

2. The method of claim 1, further comprising:
   leaving from the RRC connected state based on a response not being received from the base station until the timer for transitioning state expires, after the UE assistance information message is transmitted.

3. The method of claim 1, wherein the UE assistance information message includes information on a preference RRC state of the UE.

4. The method of claim 1, further comprising:
   performing a handover process;
   transmitting, to a target base station of the handover process, the UE assistance information message based on a reconfiguration WithSync parameter being included in the configuration information for the handover process, the UE assistance information message being transmitted to a base station over a source base station of the handover process within a predetermined time, and the UE assistance information message being configured to be transmitted to the target base station of the handover process; and starting or restarting the timer for transitioning state.

5. The method of claim 1, further comprising:
performing a handover process;
transmitting, to a target base station of the handover process, the UE assistance information message based on a reconfiguration WithSync parameter being included in the configuration information for the handover process, a RRCReconfiguration message being applied due to a conditional reconfiguration execution, the UE assistance information message being configured to be transmitted to the target base station of the handover process, and the UE having initiated a transmission of the UE assistance information message to the target base station; and
starting or restarting the timer for transitioning state.

6. The method of claim 1,
wherein the transmitted UE assistance information message includes first preference MUSIM gap configuration information of the UE, and
wherein the method further comprises:
transmitting a UE assistance information message including a second preferred MUSIM gap configuration information currently preferred by the UE, based on the first preferred MUSIM gap configuration information and the second preferred MUSIM gap configuration information being different and the timer for prohibiting sending preferred switching gap configuration information not running, and
starting or restarting the timer for prohibiting sending the preferred switching gap configuration information.

7. The method of claim 6, wherein the transmission of the UE assistance information message including the second preferred MUSIM gap configuration information is not performed, based on the second preferred MUSIM gap configuration information being information excluding only aperiodic MUSIM gap configuration information among the first preferred MUSIM gap configuration information.

8. The method of claim 1, further comprising:
receiving, from the base station, an RRC Reestablishment message; and
releasing the MUSIM gap configuration information configured based on the configuration information.

9. A user equipment (UE) supporting multi-universal subscriber identity module (MUSIM), the UE comprising:
transceiver; and
at least one processor coupled with the transceiver and configured to:
receive, from a base station, configuration information on a MUSIM operation,
transmit, to the base station, a UE assistance information message, in case that the UE needs to leave from a radio resource control (RRC) connected state and a timer for transitioning state is not running, and
start the timer for transitioning state based on the configuration information on the MUSIM operation,
wherein the configuration information on the MUSIM operation includes a parameter regarding the timer for transitioning state and a parameter regarding a timer for prohibiting sending preferred switching gap configuration information.

10. The UE of claim 9, wherein the at least one processor is further configured to:
leave from the RRC connected state based on a response not being received from the base station until the timer for transitioning state expires, after the UE assistance information message is transmitted.

11. The UE of claim 9, wherein the UE assistance information message includes information on a preference RRC state of the UE.

12. The UE of claim 9, wherein the at least one processor is further configured to:
perform a handover process;
transmit, to a target base station of the handover process, the UE assistance information message based on a reconfiguration WithSync parameter being included in the configuration information for the handover process, the UE assistance information message being transmitted to a base station over a source base station of the handover process within a predetermined time, and the UE assistance information message being configured to be transmitted to the target base station of the handover process; and
start or restart the timer for transitioning state.

13. The UE of claim 9, wherein the at least one processor is further configured to:
perform a handover process;
transmit, to a target base station of the handover process, the UE assistance information message based on a reconfiguration WithSync parameter being included in the configuration information for the handover process, a RRCReconfiguration message being applied due to a conditional reconfiguration execution, the UE assistance information message being configured to be transmitted to the target base station of the handover process, and the UE having initiated a transmission of the UE assistance information message to the target base station; and
start or restart the timer for transitioning state.

14. The UE of claim 9,
wherein the transmitted UE assistance information message includes first preference MUSIM gap configuration information of the UE, and
wherein the at least one processor is further configured to:
transmit a UE assistance information message including a second preferred MUSIM gap configuration information currently preferred by the UE, based on the first preferred MUSIM gap configuration information and the second preferred MUSIM gap configuration information being different and the timer for prohibiting sending preferred switching gap configuration information not running, and
start or restart the timer for prohibiting sending preferred switching gap configuration information.

15. The UE of claim 14, wherein the transmission of the UE assistance information message including the second preferred MUSIM gap configuration information is not performed, based on the second preferred MUSIM gap configuration information being information excluding only aperiodic MUSIM gap configuration information among the first preferred MUSIM gap configuration information.

16. The UE of claim 9, wherein the at least one processor is further configured to:
receive, from the base station, an RRC Reestablishment message; and release the MUSIM gap configuration information configured based on the configuration information.

* * * * *